US010653079B1

(12) United States Patent
Atkins

(10) Patent No.: US 10,653,079 B1
(45) Date of Patent: May 19, 2020

(54) UNDERGROUND TREE STAKE SYSTEM

(71) Applicant: Ginger Tree Innovations, LLC, Dripping Springs, TX (US)

(72) Inventor: Adam Atkins, Dripping Springs, TX (US)

(73) Assignee: Ginger Tree Innovations, LLC, Austin, TX (US)

( * ) Notice: Subject to any disclaimer, the term of this patent is extended or adjusted under 35 U.S.C. 154(b) by 160 days.

(21) Appl. No.: 15/684,335

(22) Filed: Aug. 23, 2017

Related U.S. Application Data

(60) Provisional application No. 62/379,508, filed on Aug. 25, 2016.

(51) Int. Cl.
*A01G 9/12* (2006.01)
*A01G 17/04* (2006.01)

(52) U.S. Cl.
CPC .................................. A01G 17/04 (2013.01)

(58) Field of Classification Search
CPC .......... A01G 17/06; A01G 17/14; A01G 9/12; A01G 9/122; A01G 9/124
USPC .............................. 47/42, 43, 44, 45, 47, 70
See application file for complete search history.

(56) References Cited

U.S. PATENT DOCUMENTS

| | | | | |
|---|---|---|---|---|
| 1,874,029 A * | 8/1932 | Condon | .................. | A01G 23/04 47/58.1 R |
| 2,102,748 A | 6/1936 | Rocquin | | |
| D218,907 S * | 10/1970 | Maxwill | ............................ | D8/1 |
| 3,571,972 A * | 3/1971 | Carter, Jr. | .......... | A01G 13/0281 47/32.4 |
| 4,258,523 A * | 3/1981 | Waugh | .................... | A01G 17/14 256/47 |
| 4,383,396 A * | 5/1983 | Waugh | .................... | A01G 17/14 47/47 |
| 4,807,393 A | 2/1989 | Bracken | | |
| 4,828,233 A * | 5/1989 | Hagemeister | .......... | A47C 23/05 267/100 |
| 4,894,950 A * | 1/1990 | Yukio | .................... | A01G 17/04 47/42 |
| 6,065,243 A | 5/2000 | Mancini et al. | | |
| 6,141,903 A | 11/2000 | Mancini | | |
| 6,389,743 B1 * | 5/2002 | Stephenson | ............. | A01G 17/12 47/43 |
| 6,516,561 B1 * | 2/2003 | Mancini | ................ | A01C 23/027 47/42 |
| 6,625,926 B1 * | 9/2003 | Mancini | ................. | A01G 17/04 47/32.5 |
| 6,772,558 B2 * | 8/2004 | Mancini | ................ | A01C 23/027 411/470 |

(Continued)

FOREIGN PATENT DOCUMENTS

| CN | 201222913 Y | 4/2009 |
|---|---|---|
| CN | 201319782 Y | 10/2009 |

(Continued)

*Primary Examiner* — Monica L Williams
*Assistant Examiner* — Michael A. Fabula
(74) *Attorney, Agent, or Firm* — Lee & Hayes, P.C.

(57) ABSTRACT

An underground tree staking system that includes a ridged w-unit that may releasably couple to a ridged stabilizer. The w-unit includes at least three arcs or curves that are each configured to engage with hooks of a stake to apply a downward force on the root ball that allows the plant to resist forces experienced during high winds by the trunk and branches.

20 Claims, 19 Drawing Sheets

(56) References Cited

U.S. PATENT DOCUMENTS

| | | | |
|---|---|---|---|
| 7,661,224 B1* | 2/2010 | Poyas | A01G 9/12 248/218.4 |
| 8,132,361 B1* | 3/2012 | Poyas | A01G 17/12 248/218.4 |
| 8,316,579 B1* | 11/2012 | Brown | A01G 13/0237 47/42 |
| 8,336,252 B1* | 12/2012 | Ammons | A01G 23/04 47/42 |
| 8,567,118 B2* | 10/2013 | Farmer | A01G 17/04 47/32 |
| 9,769,993 B1* | 9/2017 | Lott | A01G 17/04 |
| 9,894,846 B1* | 2/2018 | Young | A01G 17/04 |
| 2003/0132362 A1* | 7/2003 | Miller | A01G 29/00 248/530 |
| 2003/0182853 A1* | 10/2003 | Mancini | A01C 23/027 47/42 |
| 2003/0192238 A1 | 10/2003 | Mancini | |
| 2005/0132645 A1* | 6/2005 | Johns | A01G 9/122 47/42 |
| 2006/0185232 A1* | 8/2006 | Spicer | A01G 17/04 47/42 |
| 2008/0092439 A1* | 4/2008 | Banks | A01G 9/122 47/47 |
| 2009/0119984 A1* | 5/2009 | Nabhan | A01G 17/04 47/43 |
| 2009/0133323 A1 | 5/2009 | Farmer et al. | |
| 2012/0097080 A1* | 4/2012 | Agg | A01G 17/04 111/100 |
| 2014/0109474 A1* | 4/2014 | Reed, Jr. | A01G 9/12 47/45 |
| 2014/0202074 A1* | 7/2014 | Essafi | A01G 13/0237 47/42 |

FOREIGN PATENT DOCUMENTS

| | | | |
|---|---|---|---|
| DE | 4008580 A1 | 9/1991 | |
| EP | 570035 * | 11/1993 | ............ A01G 9/12 |
| EP | 0705535 A1 | 4/1996 | |
| JP | H03112419 A | 5/1991 | |
| JP | H04173027 A | 6/1992 | |
| JP | H05260862 A | 10/1993 | |
| JP | H06141705 A | 5/1994 | |
| JP | H0787853 A | 4/1995 | |
| JP | H07115857 A | 5/1995 | |
| JP | H07147848 A | 6/1995 | |
| JP | H089798 A | 1/1996 | |
| JP | H0870715 A | 3/1996 | |
| JP | H0889107 A | 4/1996 | |
| JP | H08116806 A | 5/1996 | |
| JP | H08256615 A | 10/1996 | |
| JP | H0956270 A | 3/1997 | |
| JP | H09313054 A | 12/1997 | |
| JP | H1014415 A | 1/1998 | |
| JP | H1014417 A | 1/1998 | |
| JP | 3063338 U | 10/1999 | |
| JP | 2001054327 A | 2/2001 | |
| JP | 2003116374 A | 4/2003 | |
| JP | 2003274771 A | 9/2003 | |
| JP | 2004065058 A | 3/2004 | |
| JP | 2004073075 A | 3/2004 | |
| JP | 2008109912 A | 5/2008 | |
| JP | 2008161136 A | 7/2008 | |
| JP | 2008193972 A | 8/2008 | |
| KR | 101015636 B | 2/2011 | |
| WO | WO2010073395 A1 | 7/2010 | |

* cited by examiner

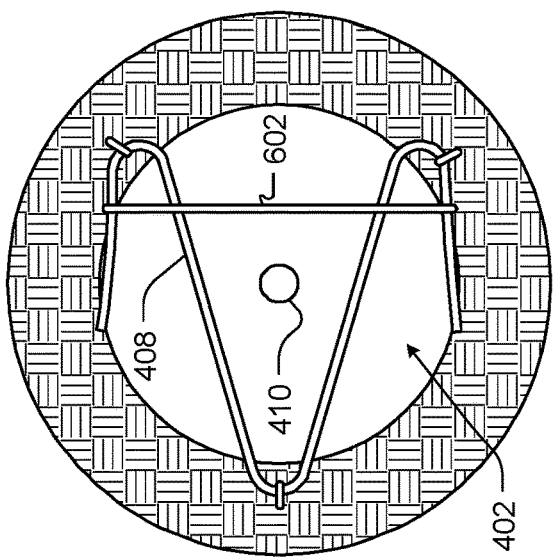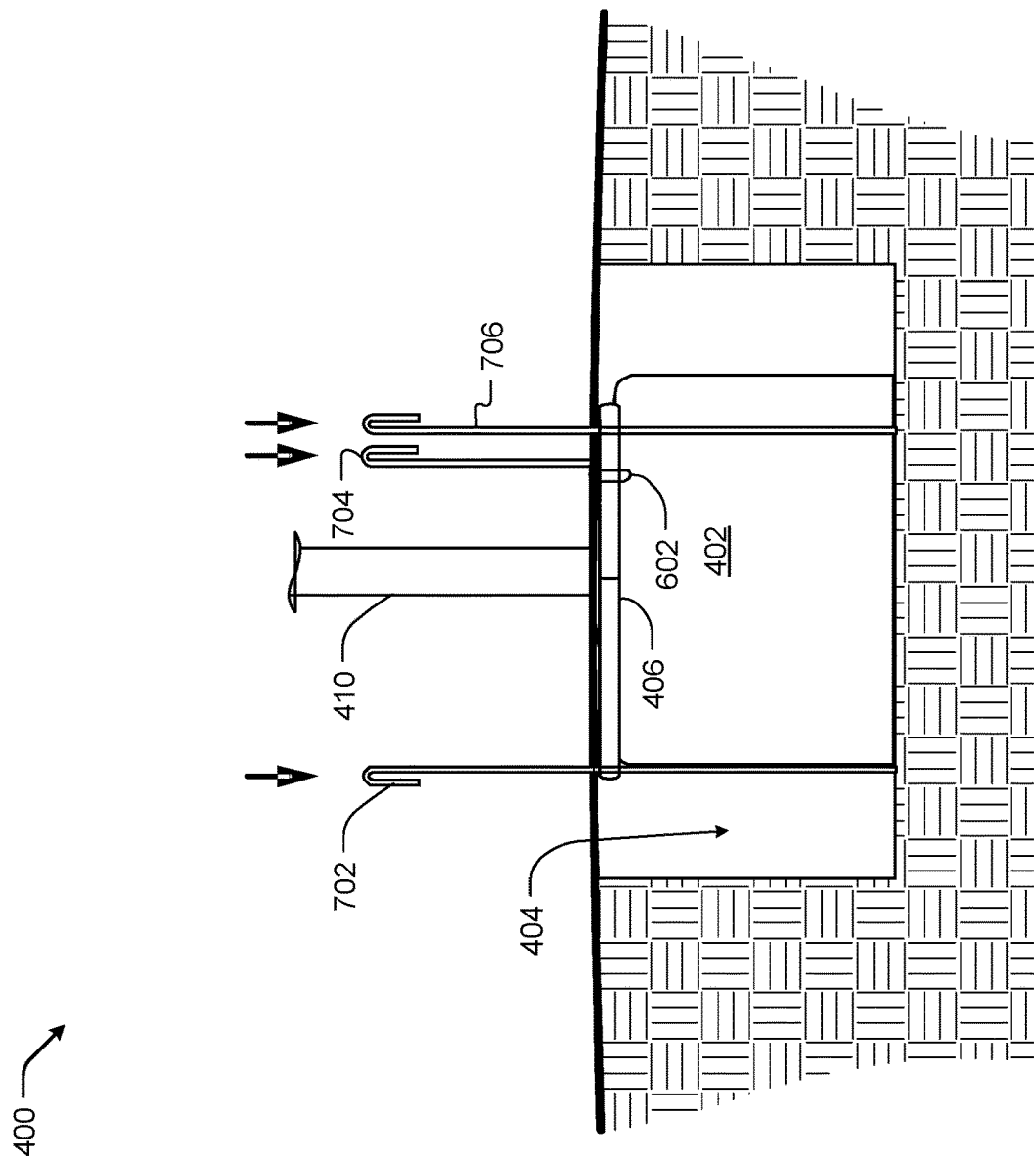
FIG. 7

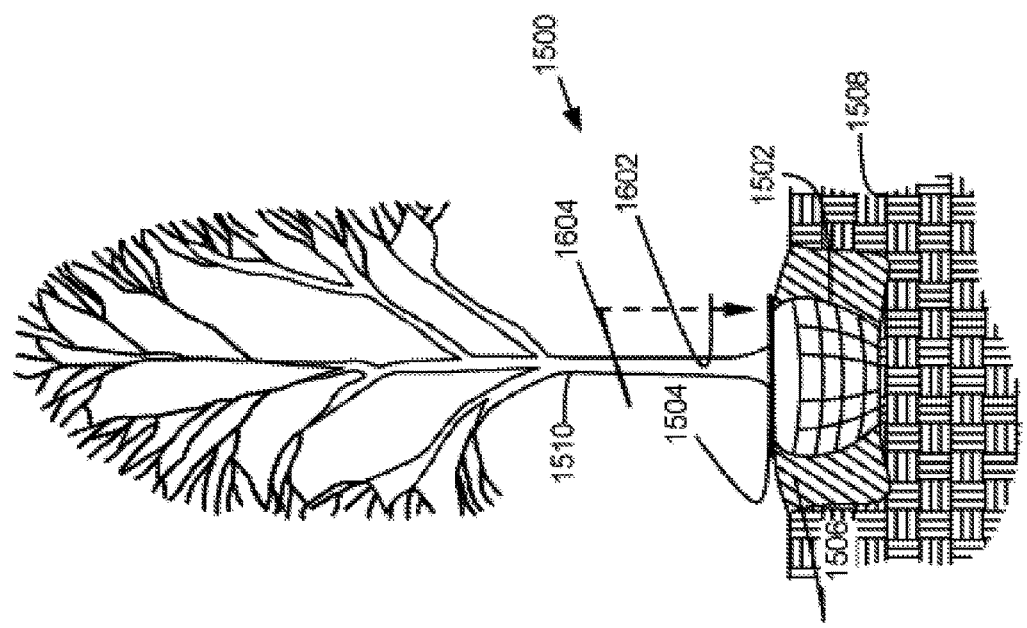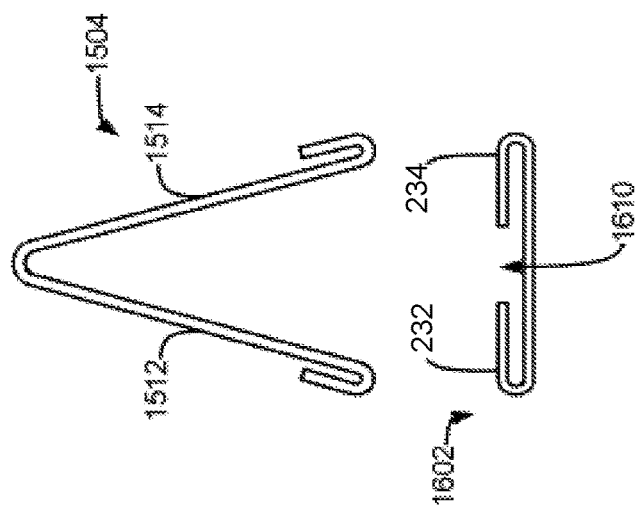
FIG. 16

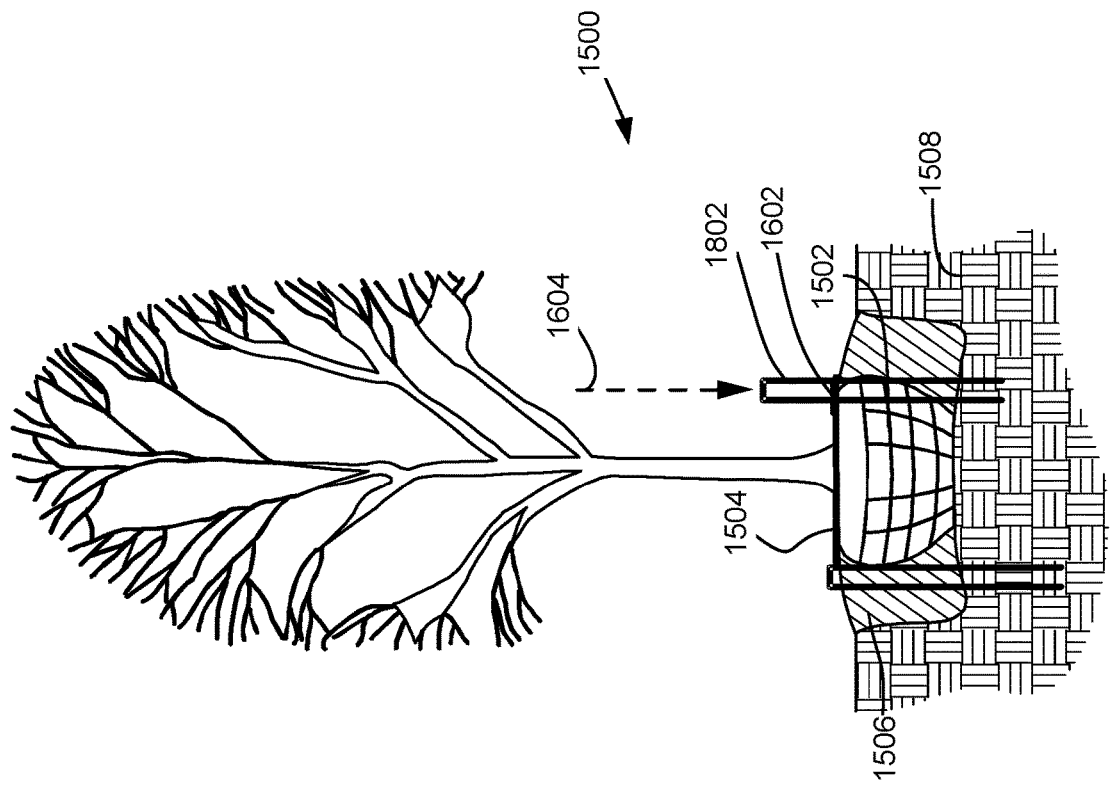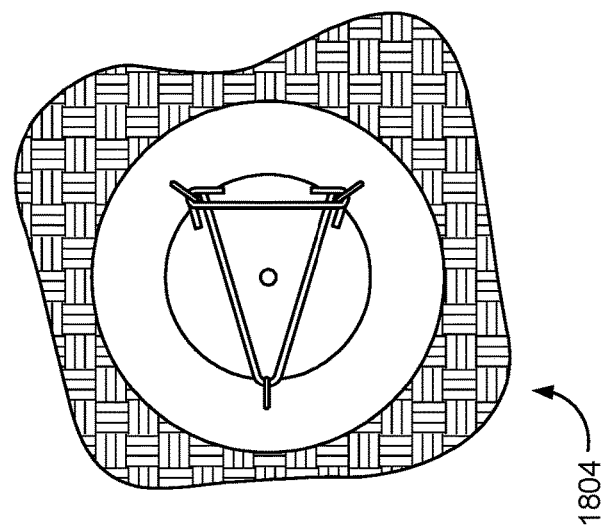
FIG. 18

UNDERGROUND TREE STAKE SYSTEM

CROSS-REFERENCE TO RELATED APPLICATION(S)

This application claims priority to U.S. Provisional Application No. 62/379,508 filed on Aug. 25, 2016 and entitled "Underground Tree Stake System," which is incorporated herein by reference in its entirety.

BACKGROUND

Staking of new trees and other plants to prevent the trees from falling over and becoming uprooted during storms and high winds is a common practice. However, the tree stakes typically extend upward out of the ground at three or more locations around the trunk of the tree. The stakes are both unsightly and a nuisance to anyone preforming lawn or tree maintenance, as the stakes extend around the tree above the ground. Additionally, the stakes may be a hazard causing bodily harm as the typically metal stakes rust or undergo wear and tear, particularly to children whom may be attracted to play with the stakes as a toy.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 7 is yet another example of an underground tree stake system being installed on a root ball according to some implementations.

FIG. 16 illustrates an example of an underground tree stake system being installed on a tree root ball of FIG. 15.

FIG. 18 illustrates an example of an underground tree stake system being installed on a tree root ball according to some implementations.

DETAILED DESCRIPTION

This disclosure includes techniques and implementations for staking a tree or installing a tree stake using a staking system that is associated with or restrains the root ball in place of the trunk of the tree. For example, by securing the root ball in lieu of the trunk of the tree, the staking system may be positioned below ground or at the ground level, thereby removing nuisances associated with, for instance, mowing the lawn area around the newly established tree or plant. Additionally, the underground or ground level staking system reduces risk of injury associated with the stake extending out of the ground posed by incidental contact with the stakes.

In some examples, the underground tree staking system is a substantially triangular shape formed from a ridged material, such as metals, alloys, or hard plastics. For instance, the underground tree staking system may include a saddle member that goes over the top surface of the root ball of the newly established plant or tree. The saddle member may include a w-unit and a stabilizer. The w-unit may be formed substantially in the shape of a w. For instance, the w-unit may have a first end and a second end and include three bends or arcs. For example, the first arc may be the leftmost arc and open upwards, the second arc may be the middle arc and open downwards, and the third arc may be the rightmost arc and open upwards again to form the w shape. The stabilizer may couple to the w-unit between the top arc and the bottom two arcs forming the w shape such that the trunk of the tree or plant is between the stabilizer and the apex of the top arc and the stabilizer may engage each leg of the w-shape, as will be discussed in more detail below.

Each of the arcs may be configured to receive a stake or vertical securing member that couples with the corresponding arc and pulling the saddle member downwards towards the surface of the ground and thereby both pulling the root ball down and preventing the plant from uprooting or toppling during high winds.

Figure 1:
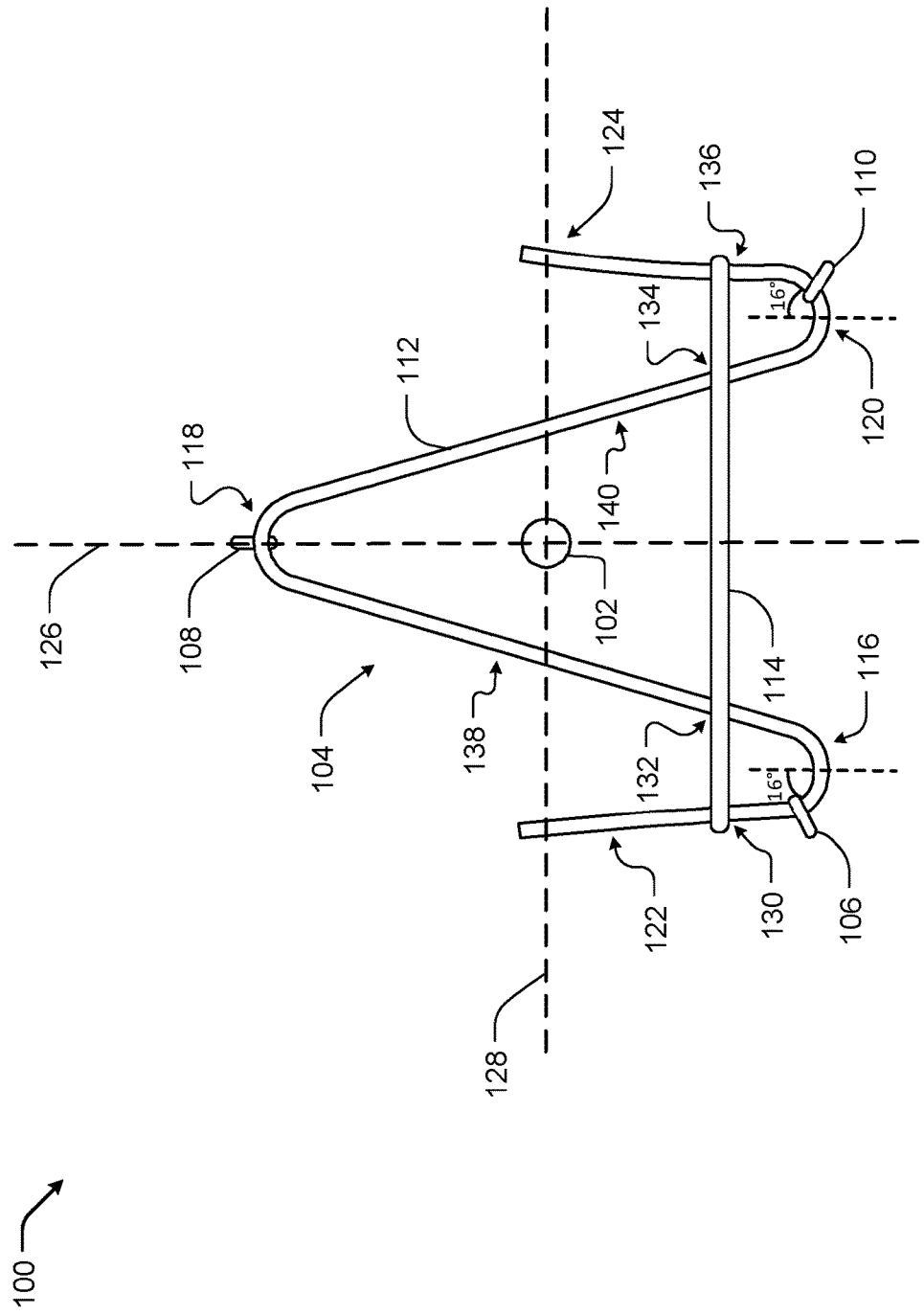
FIG. 1 illustrates an example overhead view of an underground tree stake system according to some implementations.

FIG. 1 illustrates an example overhead view of an underground tree stake system 100 according to some implementations. In the illustrated example, the tree stake system 100 is installed around a tree 102 and includes a saddle member 104 and three stakes 106, 108, and 110. In general, the stakes 106-110 apply a downward force or resistance to upward force on the saddle member 104 and the saddle member 104 transfer the downward force or resistance to upward force to the tree or other plant by applying the downward force or resistance to upward force to the root ball (not shown).

The saddle member 104 includes a w-unit 112 and a stabilizer 114. The w-unit 112 may be formed substantially in the shape of a w, as shown. For instance, the w-unit 112 may have a first end and a second end and include three bends or arcs, generally indicated by 116, 118, and 120. For example, the arc 116 may be the leftmost arc (when viewing the saddle member 104 as a w) and open upwards, the arc 118 may be the middle arc and open downwards, and the arc 120 may be the rightmost arc and open upwards again to form the w shape. In the current example, the arc 116 may have a radius of approximately one and half inches and form an approximately four and three-fourths inch arc. The arc 118 may have a radius of approximately one and three fourths inches and form an approximately five-inch arc. In other cases, the arc may have been formed as a sixty-degree curve. The arc 120 may be substantially similar to the arc 116 and have a radius of approximately one and half inches and form an approximately four and three-fourths inch arc. Thus, in this example, the arms of the w-unit 112 may extend upward from the arc 116 and 120 at approximately sixteen degrees between the arms and downward from the arc 118 at approximately thirty-two degrees between the arms.

The left arm 122 of the w-unit 112, as discussed above, may extend upwards from the arc 116 at sixteen degrees from center. The right arm 124 of the w-unit 112, as discussed above, may extend upwards from the arc 120 at sixteen degrees from center. In some examples, the left arm 122 and the right arm 124 may be formed to include an additional bend (not shown) to adjust the direction of the arm 122 or 124 outward by an additional five degrees from the center of the respective arc 116 or 120.

The stakes 106-110 are positioned with respect to the trunk 102 of the tree or plant such that stake 108 is aligned along a first axis 126 of the trunk, generally shown as line, and above a second axis 128 of the trunk, generally indicated by line. The stake 106 is aligned to the left of the first axis 126 and below the second axis 128. The stake 110 is aligned to the right of the first axis 126 and below the second axis 128. Thus, the stakes 106-110 may provide lateral support or force to the saddle member 104 that may transfer the lateral support of force to the root ball thereby allowing the tree or plant 102 to resist lateral forces caused by winds.

The stabilizer 114 may couple to the w-unit 112 below the second axis 128 and above the arcs 116 and 120 such that the trunk 102 of the tree or plant is between the stabilizer 114 and the apex of the arc 118. In the current example, the stabilizer 114 may couple to the w-unit 112 at four locations 130, 132, 134, and 136 as shown. For instance, the stabilizer 114 may engage to the left arm 122 and the right arm 124 as well as the two interior arms 138 and 140. In some examples, the stabilizer 114 may be permanently or integrally coupled to the w-unit 112, for instance, via welding, adhesives, molding, laminations, or other known processes. In other cases, the stabilizer 114 may be releasably coupled to the w-unit 112 via for example, a folding and/or locking of the stabilizer 114 around the arms 124, 126, 138, and 140.

In some cases, the left arm 122 and right arm 124 may be formed as a ratio or percentage of the length of the two interior arms 138 and 140. For example, the ratio of the left arm 122 and right arm 124 to the two interior arms 138 and 140 may be 1:2 or 50%. In other cases, the length of the right arm 122 and/or the left arm 124 may be less than 70% of the length of the interior arms 138 and 140. In another example, the length of the right arm 122 and/or the left arm 124 may be less than 50% of the length of the interior arms 138 and 140. In yet another case, the length of the right arm 122 and/or the left arm 124 may be less than 40% of the length of the interior arms 138 and 140. In yet another case, the length of the right arm 122 and/or the left arm 124 may be less than 30% of the length of the interior arms 138 and 140.

In some examples, the saddle member 104 may be formed from an eight-foot bar of rebar, steel, aluminum, titanium or other metal or alloy that is bent or folded into the w shape. For example, a w-unit 112 formed from an eight-foot bar of rebar provides resistance to lateral and vertical forces to restrain a plant having less than or equal to approximately sixty-five-gallon bucket or a less than or equal to approximately twenty-four-inch box tree. In another example, a w-unit 112 formed from a six and half foot bar of rebar provides resistance to lateral and vertical forces to restrain a plant having less than or equal to approximately thirty-gallon bucket or a less than or equal to approximately twenty-inch box tree. In other cases, the saddle member 104 including the w-unit 112 and the stabilizer 114 may be formed from other types of polymers, such as various plastics.

Figure 2:
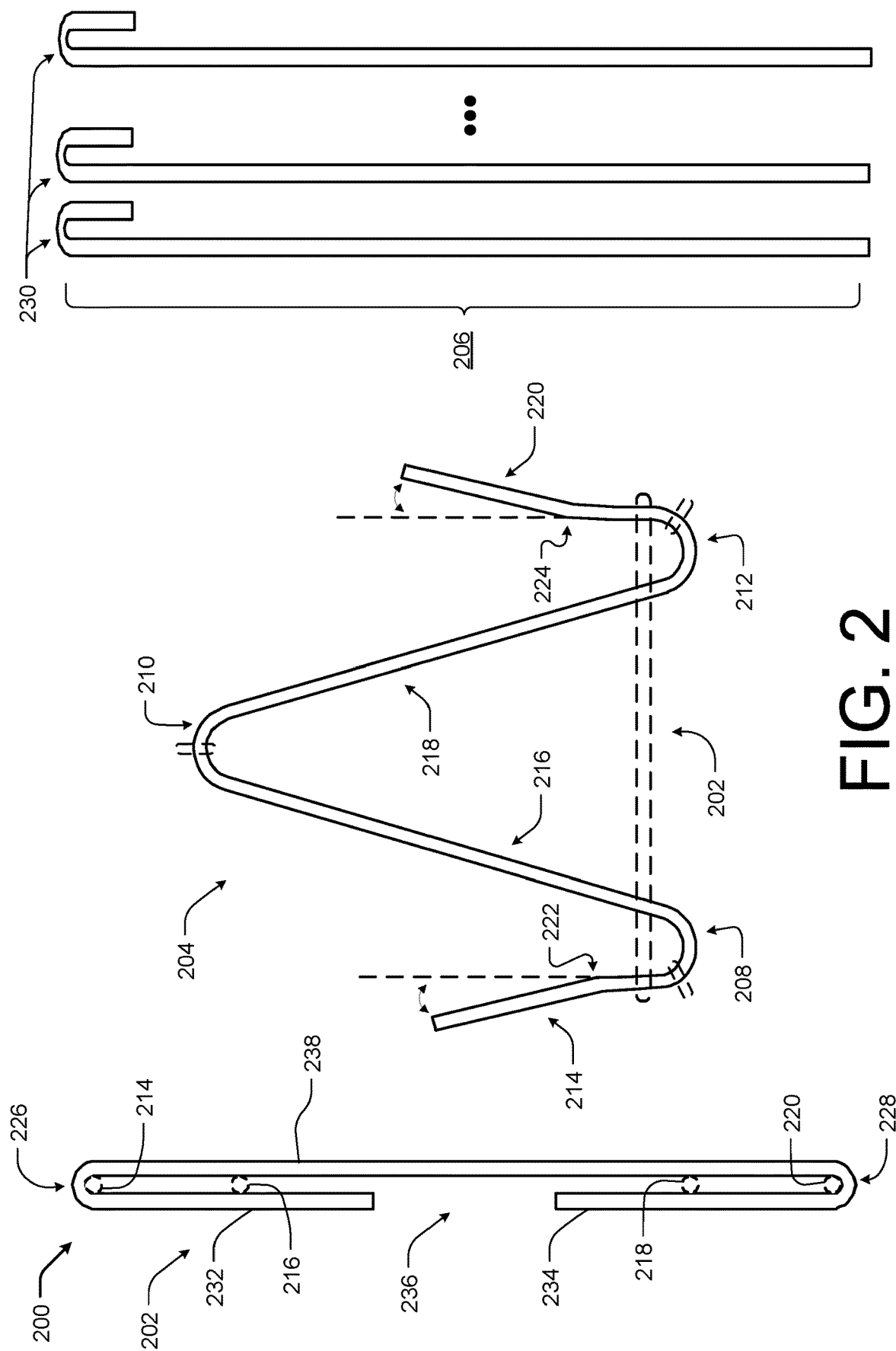
FIG. 2 illustrates an example component of an underground tree stake system according to some implementations.

FIG. 2 illustrates an example of components of an underground tree stake system 200 according to some implementations. In the current example, the tree stake system 200 is a hard, rigid, or stiff system shown as separate components, the stabilizer 202, the w-unit 204 and the stakes 206. As discussed above, the w-unit 204 is formed by three arcs 208, 210, and 212 as well as four arms 214, 216, 218, and 220. In the current example, the arm 214 may include a bend at a location, generally indicated by 222. At the bend 222, the arm 214 may experience an approximately five degrees' outward shift in trajectory or angle of the arm when compared to the trajectory of the arm 214 prior to the bend 222. Similarly, the arm 220 may also have an approximately five-degree outward tilt or angle starting at a location, generally indicated by 224. The additional tilt or outward trajectory may assist the tree stake system 200 in resisting forces applied, by for instance the wing, on the tree or plant being restrained.

Both the stabilizer 202 and the stakes 206 are illustrated as removed from the w-unit 204, as indicated by the dotted lines. In the illustrated example, the stabilizer 202 may be formed from a fourth two inches to fourth eight inches in length of rebar folded inward and around the w-unit 204 at both ends. For instance, the stabilizer 202 may be folded at a first end, generally indicated by 226, and at a second end, generally indicated by 228. At the first end 226, the stabilizer 202 may be bent to engage the arm 214 of the w-unit 204, as shown. Similarly, at the second end 228, the stabilizer 202 may be bent in a manner to engage the arm 220 of the w-unit 204. In some cases, the stabilizer 202 may from a closed elongated ring or oval shape, such that folded portions 232 and 234 touch or are otherwise connected. In other instances, such as the illustrated example, the folded portions 232 and 234 may be long enough to engage the arm 214 and 220 of the w-unit 204 without the risk of the arms 214 or 220 sliding out or disengaging from the stabilizer 202 during use but a gap, generally indicated by 236, may be maintained between the two folded portions 232 and 234. In one example, the stabilizer 202 may be between one foot and two feet in length and formed from a three foot to four-foot length of rebar. For instance, in one particular example, the stabilizer 202 may be formed from a three-foot six-inch length of rebar that is folded, such that the length of the rebar is one foot eleven and half inches and the two folded portions 232 and 234 have a length of eight and one quarter inches. In some cases, the rebar or other material may have a diameter of between three eights an inch and half an inch.

In some examples, the length of the folded portions 232 and 234 may be a percentage or ratio of the length of the main portion 238. For instance, the ratio between the folded portions 232 and 234 and the main portion 238 may be approximately 1:4.

In some cases, the stabilizer 202 may be welded or otherwise adhered or integrally coupled to the w-unit 204 at the first end 226 and the second end 228. In some examples, the stabilizer 202 may also engage the arms 216 and 218 of the w-unit 204 on both the top and bottom surfaces as shown. Again, the stabilizer 202 may be welded or otherwise adhered or integrally coupled to the arms 216 and 218 of the w-unit 204. In one particular example, the w-unit 204 and the stabilizer 202 may be formed as a single unit, such as via an injection molding process used on polymers and plastics.

In some implementations, each of the stakes 206 may be formed by a hooked rod or piece of rebar approximately four feet in length. In some cases, the length of rebar may range from approximately two feet to approximately six feet in length. At the top of each stake 206, a hook 230 is configured to engage and lock with the w-unit 204. In the current example, the stakes 206 may be hooked or otherwise locked to the w-unit 204 at the arcs 208-212. In some cases, the hook may be an approximately four inches long, such that if a four-foot length of rebar is bent the total height of the stake 206 is three feet eight inches.

Figure 3:
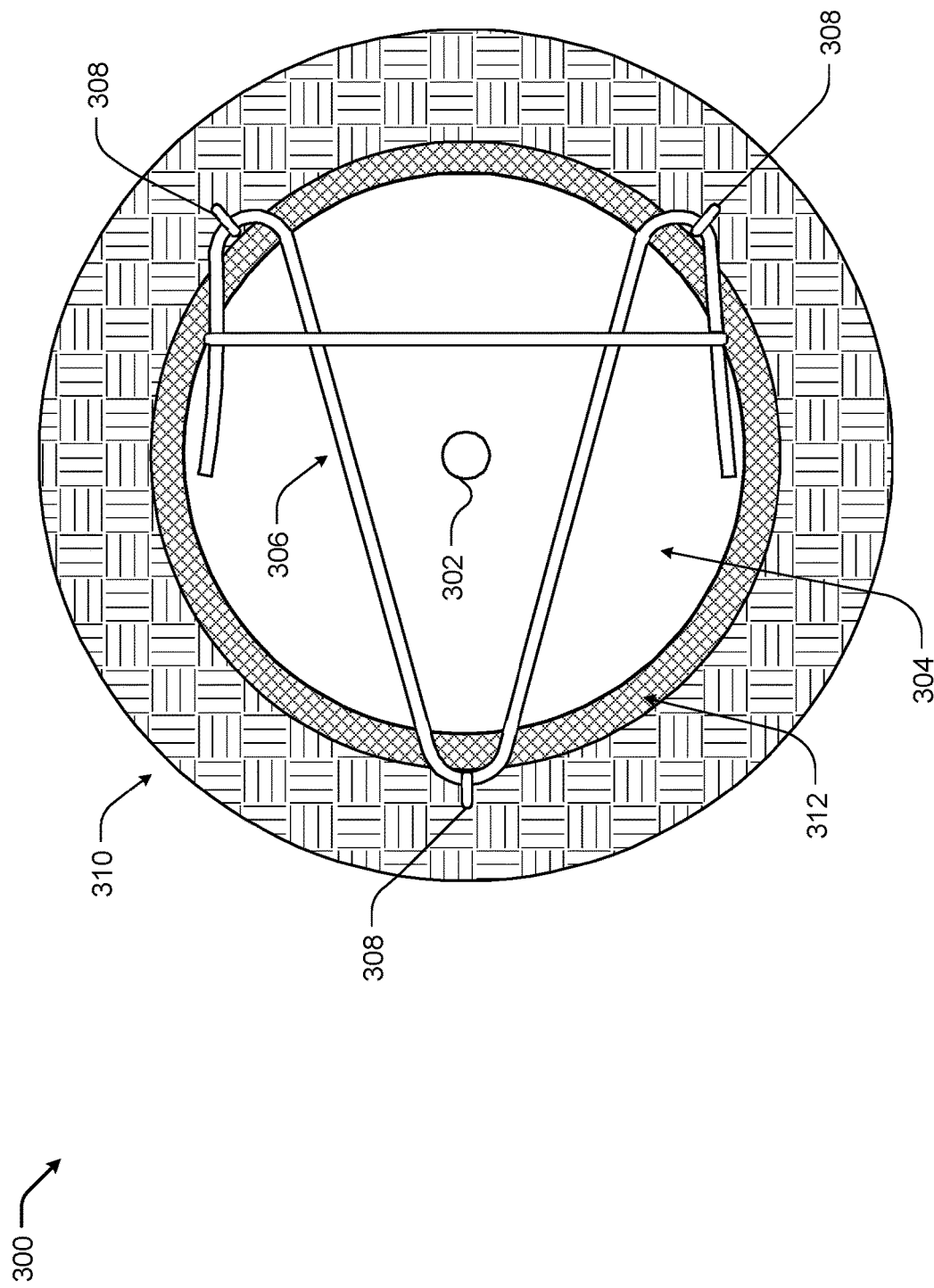
FIG. 3 illustrates another example overhead view of an underground tree stake system according to some implementations.

FIG. 3 illustrates another example overhead view of an underground tree stake system 300 according to some implementations. In the current example, a tree or plant 302 having a root ball, generally indicated by 304, is secured in place by the underground tree stake system 300. For example, a saddle member 306 including a w-unit and a stabilizer is placed around the trunk of the tree or other plant 302 and over the root ball 304. Stakes 308 are aligned with the saddle member 306 at each of the three arcs of the w-unit, as discussed above. The stakes 308 may be driven into the ground or turf 310 causing the hooks of the stakes 308 to engage the saddle member 306 and apply a downward force on the root ball around the trunk of the tree or plant 302. However, unlike typical tree stakes that extend upward out of the ground such that a rope or cable may be secured to the trunk of the tree or plant 302, the stakes 308 are driven substantially all the way into the ground and may be covered with dirt or other types of ground cover. For example, mulch may be applied over the stakes 308 and the saddle member 306.

In some cases, the plant 302 may be in a pot, such as at a nursery, but may still need to be secured against force applied by wind and other environmental factors. Thus, in the current example, the saddle member 306 may be positioned over a pot 312 including the tree or plant 302 and the stakes 308 may be positioned outside of a pot 312 and driven into the ground or turf 310 to provide the resistance to the wind and other environmental factors. In this example, the length of the stakes 308 may be increased by one to three feet in length to accommodate the height of the pot 312.

Figure 4:
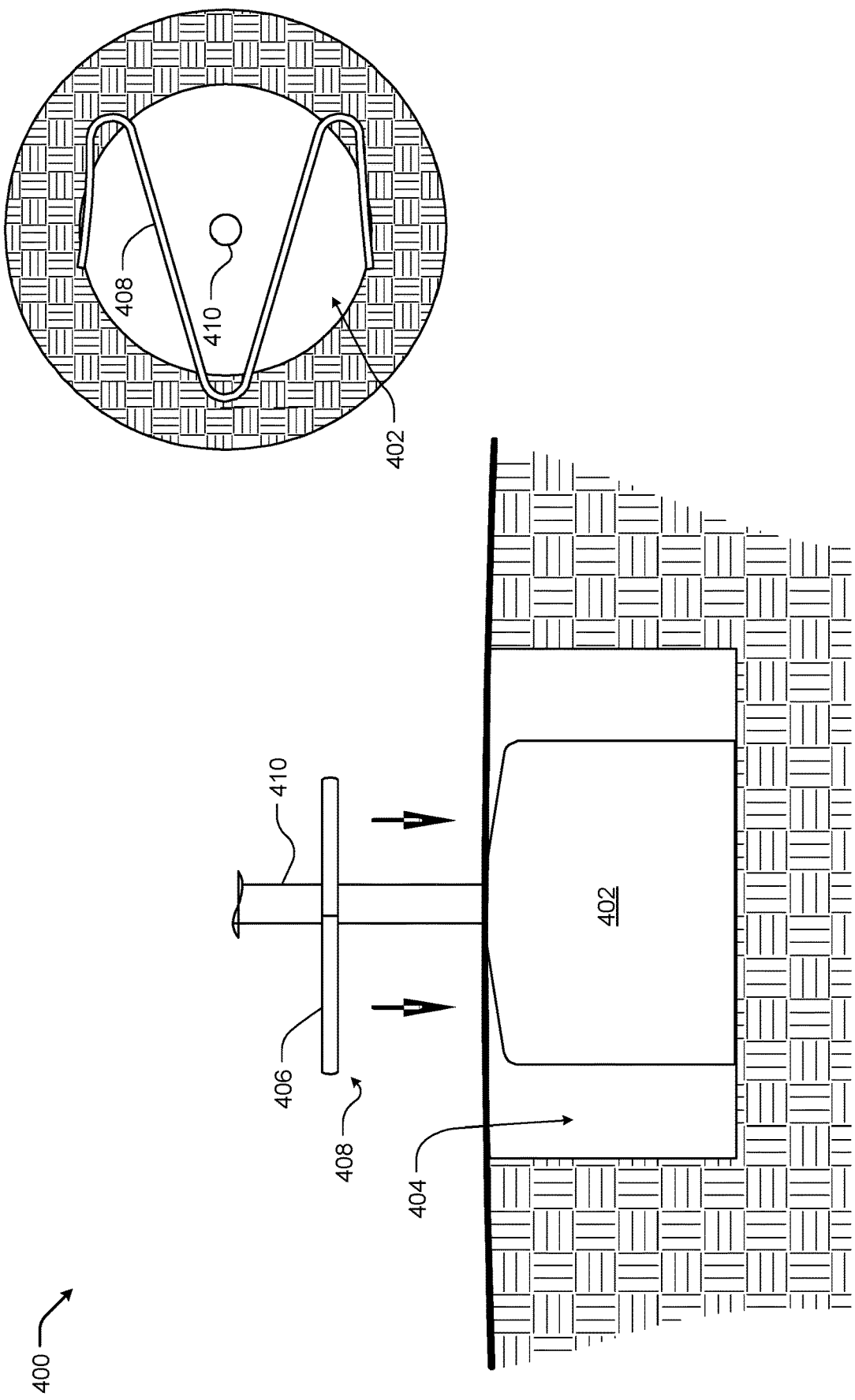
FIG. 4 is an example of an underground tree stake system being installed on a root ball according to some implementations.

FIG. 4 is an example of an underground tree stake system 400 being installed on a root ball 402 according to some implementations. In the current example, the root ball 402 has been removed from a grower's pot and placed into a hole 404 for permanent planting. The w-unit 406 of the saddle member 408 is placed over the trunk 410 of the tree or plant to place over and in contact with the root ball 402.

Figure 5:
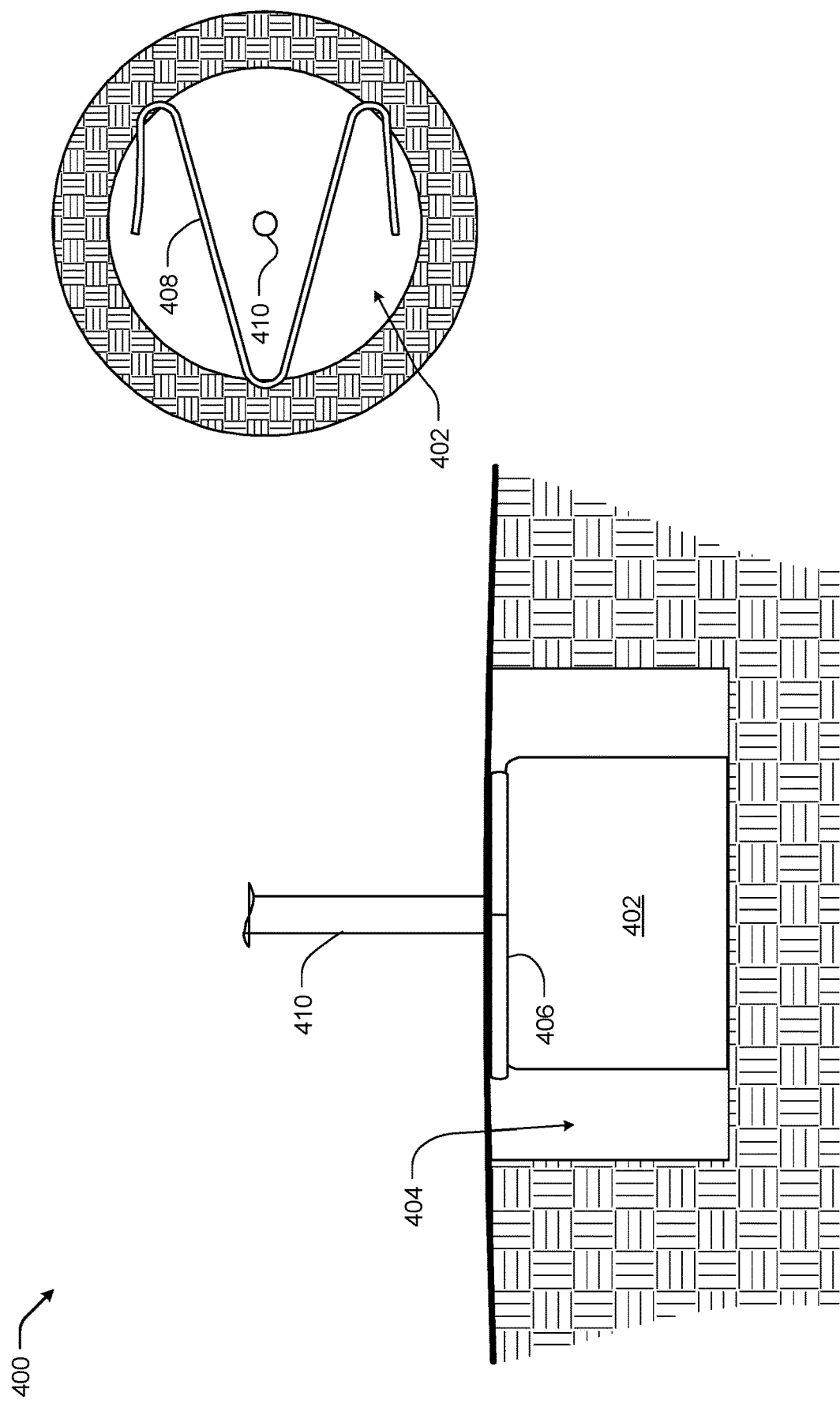
FIG. 5 is another example of an underground tree stake system being installed on a root ball according to some implementations.

FIG. 5 is another example of an underground tree stake system 400 being installed on a root ball 402 according to some implementations. In the current example, the w-unit 406 has been placed over and in contact with the root ball 402, such that the trunk 410 is contained within the w-unit 406. In the current example, the stabilizer has not yet been coupled to the w-unit 406. For instance, providing a two-part saddle member 408 including the w-unit 406 and the stabilizer may allow for easier installation on tall trees. However, in other examples, the stabilizer may be internally coupled to the w-unit 406 when the saddle member 402 is placed over the root ball 402 to provide additional structural support.

Figure 6:
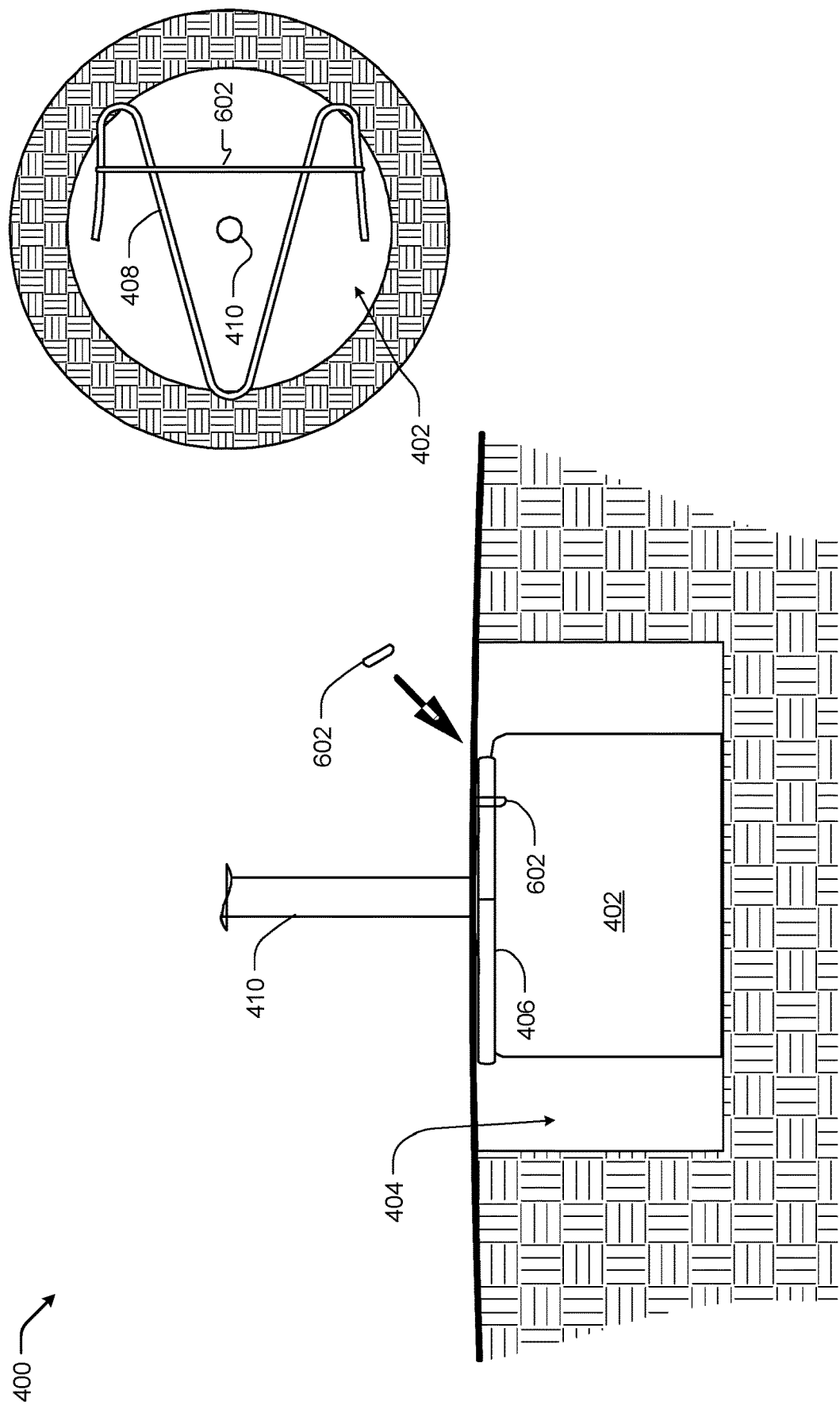
FIG. 6 is yet another example of an underground tree stake system being installed on a root ball according to some implementations.

FIG. 6 is yet another example of an underground tree stake system 400 being installed on a root ball 402 according to some implementations. In the current example, a stabilizer 602 of the saddle member 406 is in place over a bottom of the w-unit 406 as shown. In this example, the stabilizer 602 may remain releasably coupled to the w-unit 406, such that the stabilizer 602 is secured to the w-unit 406 by the placement of the stakes and by the downward force applied by the stakes on the saddle member 406, as will be discussed below with respect to FIG. 7.

FIG. 7 is yet another example of an underground tree stake system 400 being installed on a root ball 402 according to some implementations. In the current example, the saddle member 406 is in place and stakes 702, 704, and 706 are being aligned with the arcs of the w-unit of the saddle member 402, as discussed above. As shown, the stakes 702-706 extend downward into the hole 404 around the outside of the root ball 402 to apply a downward force that acts to resist lateral forces experienced by the trunk 410 and branches (not shown) of the tree or plant. Additionally, the stakes 704 and 706 lock the stabilizer 602 in place around the w-unit 406.

Figure 8:
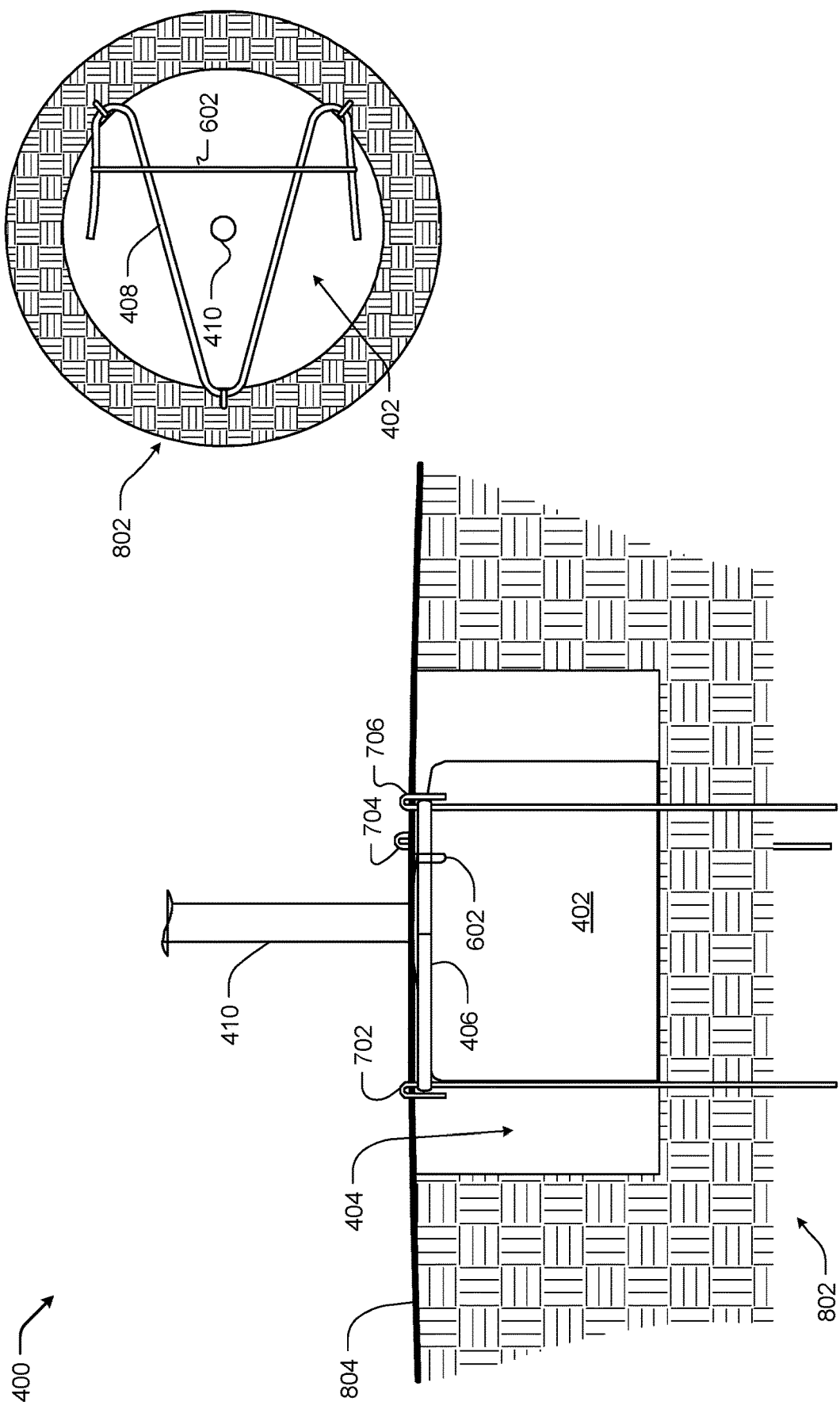
FIG. 8 is yet another example of an underground tree stake system being installed on a root ball according to some implementations.

FIG. 8 is yet another example of an underground tree stake system 400 being installed on a root ball 402 according to some implementations. In the current example, the underground tree stake system 400 has been successfully installed on the root ball 402 and around the tree 408. For example, the stakes 702-706 are anchored around the root ball 402 and engaged with the w-unit 406 of the saddle member 408. As shown, the stakes 702-708 are long enough to extend through the hole 404 into the ground 802 to provide lateral and vertical support to the tree or plant. Thus, the hole 404 may be filled in, such that the saddle member 406 and the top of the stakes 702-706 may be below ground level, generally indicated by 804, adjacent with ground level 804, or just above ground level 804.

Figure 9:
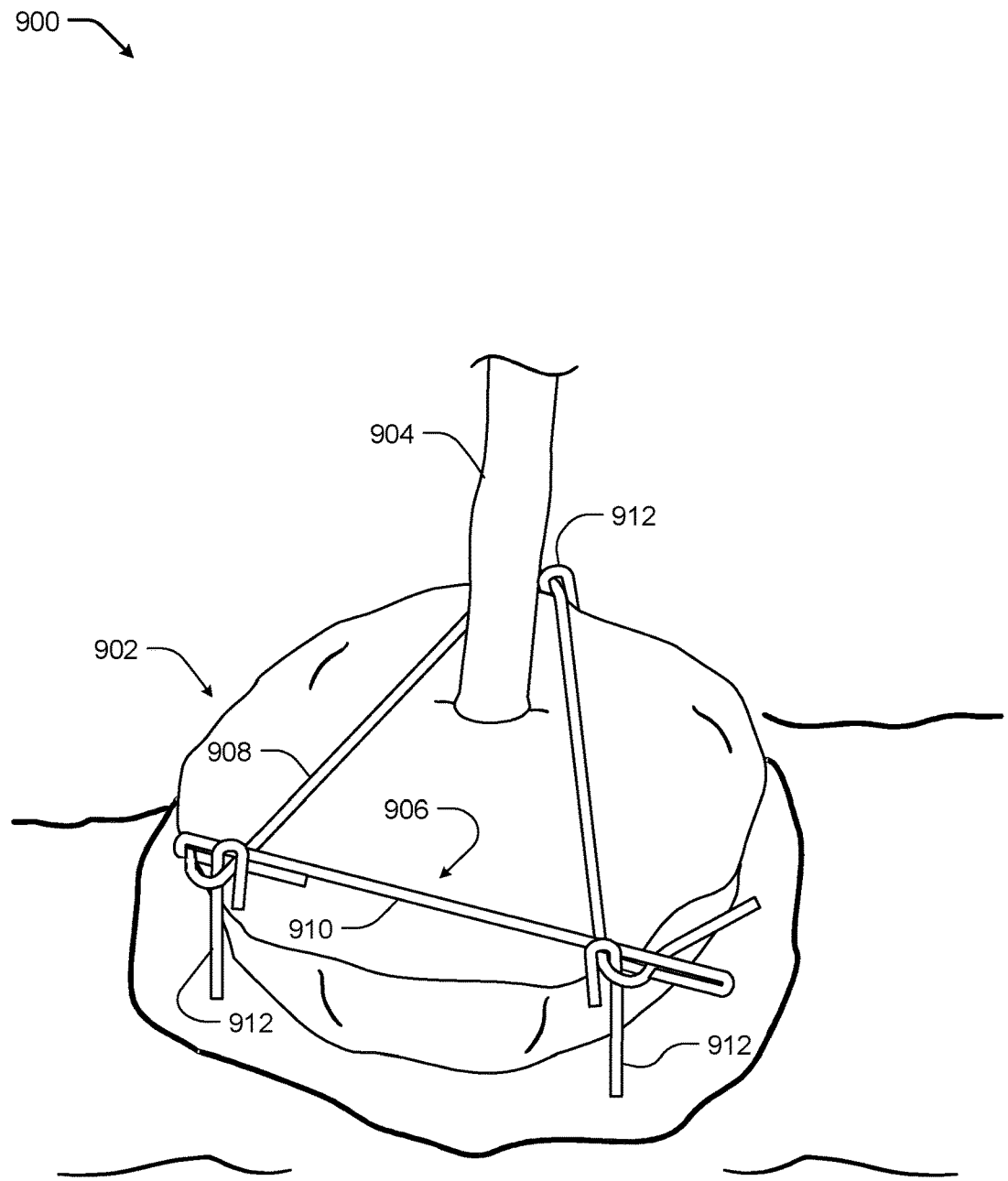
FIG. 9 is an example of an underground tree stake system installed on a root ball according to some implementations.

FIG. 9 is an example of an underground tree stake system 900 installed on a root ball 902 according to some implementations. In the current example, a tree or plant 904 having a root ball 902 is secured in place by the underground tree stake system 900. For example, a saddle member 906 including a w-unit 908 and a stabilizer 910 is placed around the trunk of the tree or other plant 904 and over the root ball 902. Stakes 912 are aligned with the saddle member 906 at each of the three arcs of the w-unit 908, as discussed above. The stakes 908 may be driven into the ground or turf causing the hooks of the stakes 912 to engage the saddle member 906 and apply a downward force on the root ball 902 around the trunk of the tree or plant 904. However, unlike typical tree stakes that extend upward out of the ground such that a rope or cable may be secured to the trunk of the tree or plant 904, the stakes 912 are driven into the ground and may be covered with dirt or other types of ground cover. For example, mulch may be applied over the stakes 912 and the saddle member 906.

Figure 10:
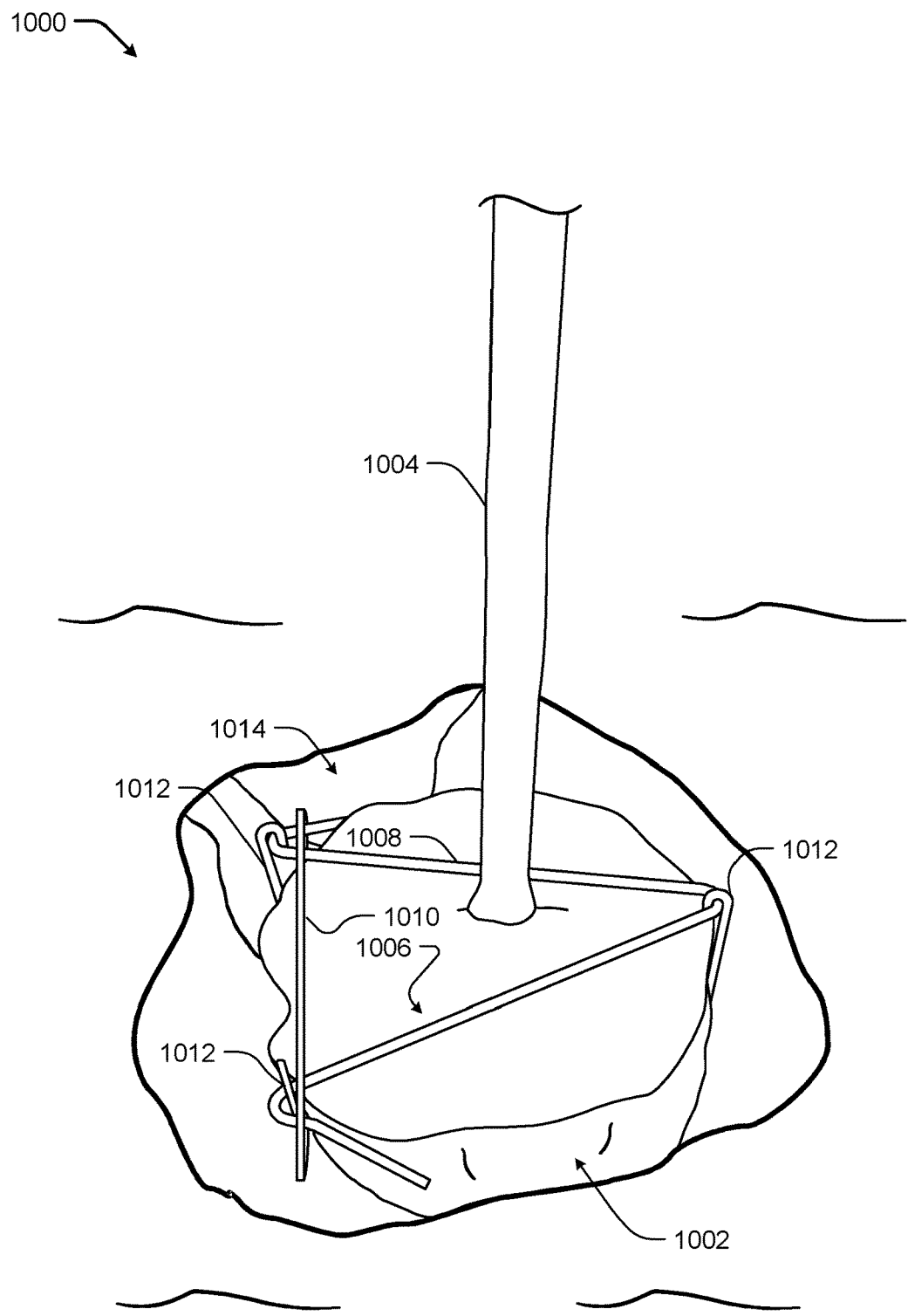
FIG. 10 is another example of an underground tree stake system installed on a root ball according to some implementations.

FIG. 10 is another example of an underground tree stake system 1000 installed on a root ball 1002 according to some implementations. In the current example, a tree or plant 1004 having a root ball 1002 is secured in place by the underground tree stake system 1000. For example, a saddle member 1006 including a w-unit 1008 and a stabilizer 1010 is placed around the trunk of the tree or other plant 1004 and over the root ball 1002. Stakes 1012 are aligned with the saddle member 1006 at each of the three arcs of the w-unit 1008, as discussed above. The stakes 1008 may be driven into the ground or turf causing the hooks of the stakes 1012 to engage the saddle member 1006 and apply a downward force on the root ball 1002 around the trunk of the tree or plant 1004 in place. However, unlike typical tree stakes that extend upward out of the ground such that a rope or cable may be secured to the trunk of the tree or plant 1004, the stakes 1012 are driven substantially all the way into the ground and may be covered with dirt or other types of ground cover. For example, dirt may be applied over the stakes 1012 and the saddle member 1006 when the hole 1014 is filled.

Figure 11:
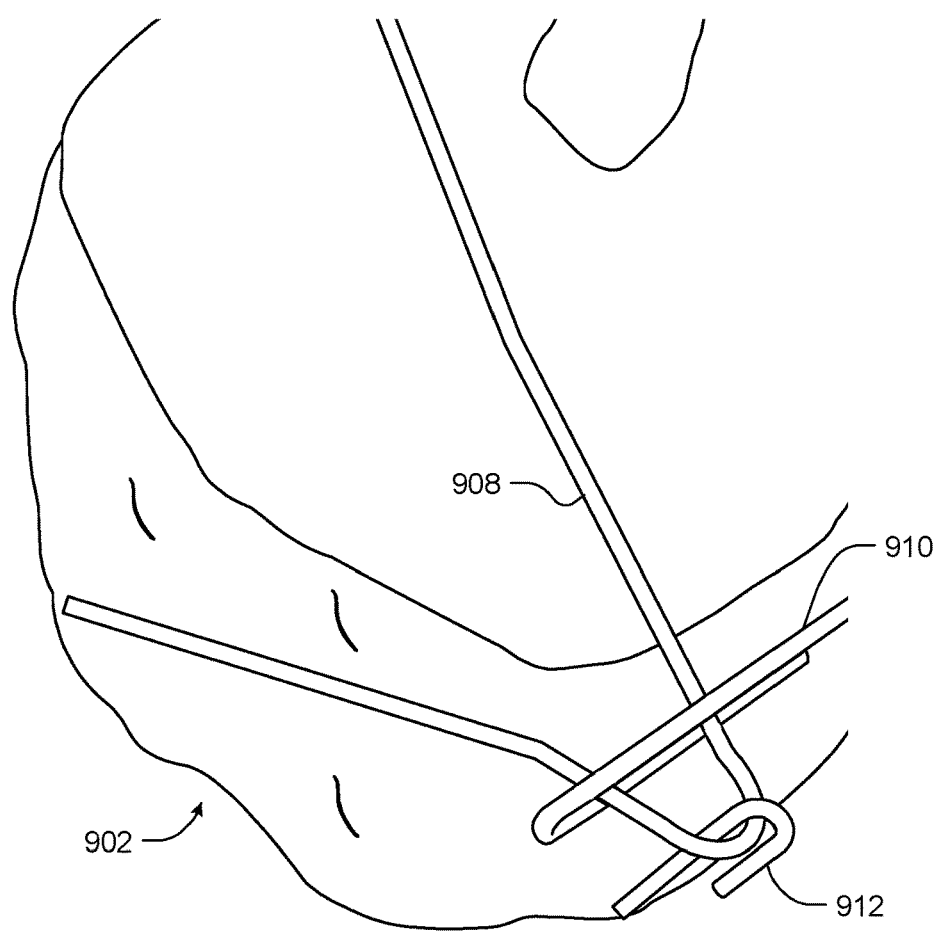
FIG. 11 is a zoomed in view of the underground tree stake system of FIG. 9 according to some implementations.

FIG. 11 is a zoomed in view of the underground tree stake system 900 of FIG. 9 according to some implementations. In the current example, one of the bottom arcs of the w-unit 908 is shown engaged by the stake 912 such that the stake 912 secures the w-unit 908 and thereby the saddle member 910 and the root ball 902 in place.

Figure 12:
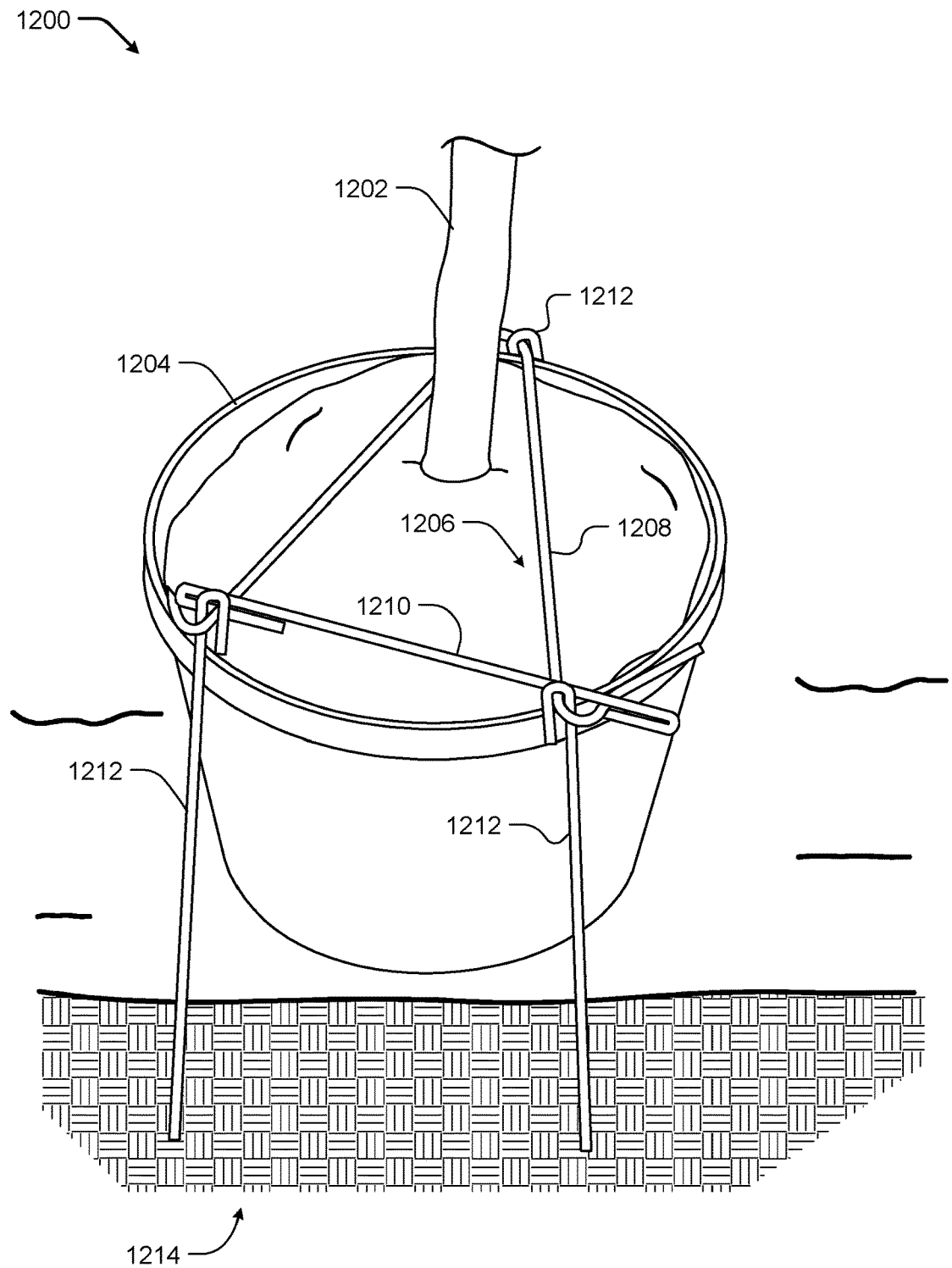
FIG. 12 is an example of an underground tree stake system installed for use with a potted plant according to some implementations.

FIG. 12 is an example of an underground tree stake system 1200 installed for use with a potted plant 1202 according to some implementations. In the current example, a tree or plant 1204 is potted or growing in pot 1204. However, in some cases, such as at a nursery, the pot 1204 may be of lightweight material or of insufficient weight to prevent the plant 1202 from tipping during storms or high winds. Thus, the tree stake system 1200 may be utilized to secure the pot 1204 and the plant 1202. In this example, a saddle member 1206 including a w-unit 1208 and a stabilizer 1210 are placed around a trunk of the plant 1202. The arcs of the w-unit 1208 are each engaged by a stake 1212. Each of the stakes 1212 are extended past the bottom of the pot 1204 and into the ground, generally indicated by 1214, thereby applying a downward force on the pot 1204 that is resistant to the forces experienced by the trunk and branches of the plant 1202.

Figure 13:
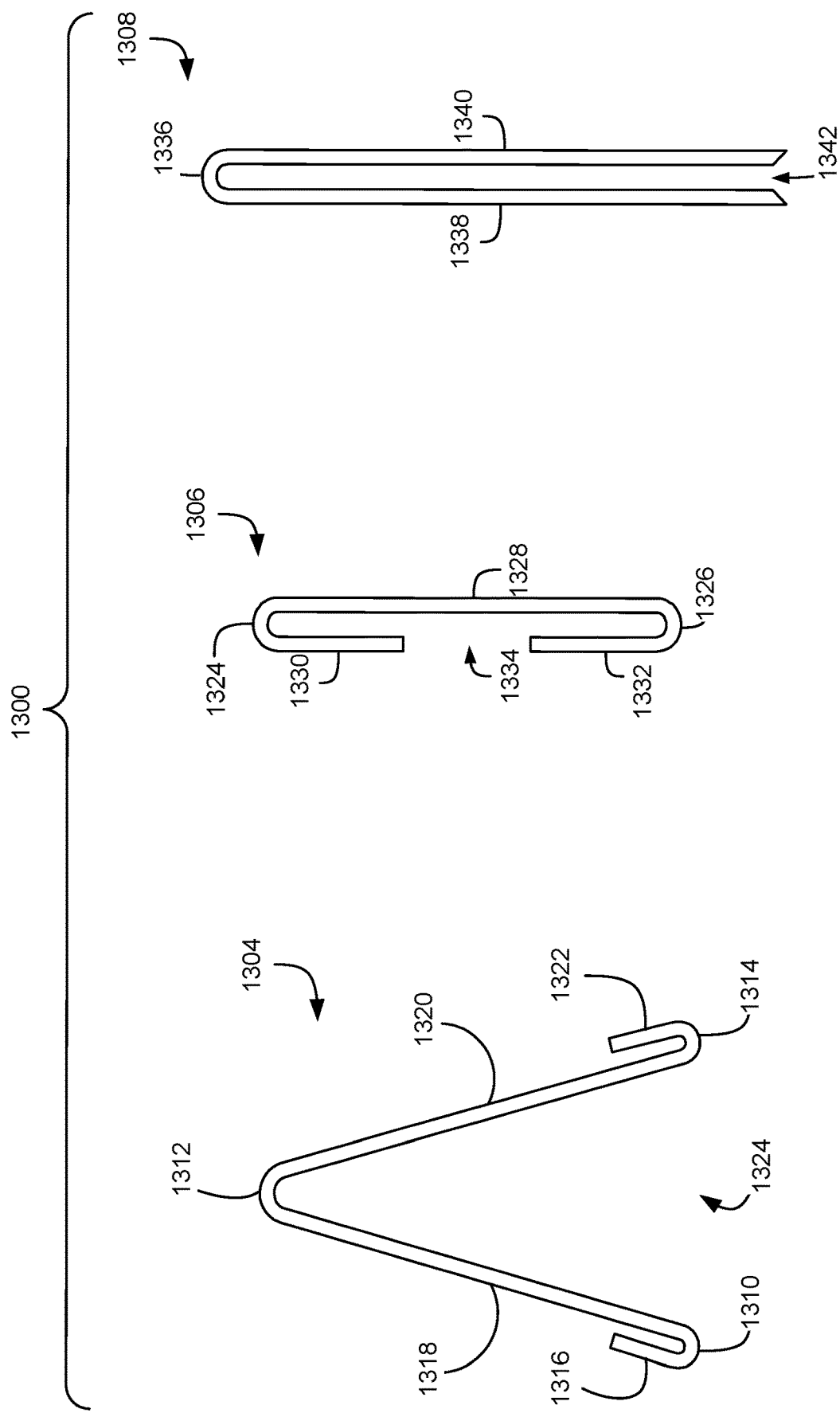
FIG. 13 illustrates an example of components of an underground tree stake system according to some implementations.

FIG. 13 illustrates an example of components of an underground tree stake system 1300 according to some implementations. In the current example, the tree stake system 1300 is a rigid system formed from a plurality of components including a saddle member 1304, a stabilizer 1306, and a stake 1308. In the illustrated example, the stabilizer 1306 and the stake 1308 are shown as disengaged from the saddle member 1304.

The saddle member 1304 is formed by a single length of material bent to form three arcs 1310, 1312, and 1314 as well as four arms 1316, 1318, 1320, and 1322. In some embodiments, such as the one shown in the illustrated example, the length of the material (e.g., pipe, rebar, or rod) used to form the saddle member 1304 may be folded to form the arcs 1310, 1312, and 1314. In one specific example, the arms 1318 and 1320 may be two feet and five and one fourth inches long and the arms 1316 and 1322 may be four and a half inches each. In some examples, the arms 1318 and 1320 may be between one foot and five and one fourth inches long and four feet and five and one fourth inches long, and the arms 1316 and 1322 may be between two and a half inches each and six and a half inches each. The angle between arms 1318 and 1320 may be between 22 and 42 degrees, but in this example the angle is approximately 32 degrees. The arc 1312 may have a radius between three fourths of an inch and two and three fourths inches, but in this example the arc 1312 has a radius of approximately one and three fourth inches. In some examples, the arcs 1310 and 1314 may each have a radius between half an inch and two inches, but in this example the arcs 1310 and 1314 each have a radius of approximately one inch.

A gap 1334 exists between arms 1318 and 1320. At its widest point, the gap 1334 in this example is approximately two feet wide. In some cases, the size of the distance between the arm 1318 and 1320 may vary from less than one inch to as wide as two and half feet. Since, the arms 1318 and 1320 are formed by bending a single length of material, the gap 1334 has an opening at one end and is closed at the opposing end, such that the saddle member 1304 forms a substantially triangular shape.

In this example, ratio of the length of arms 1318 and 1320 to 1316 and 1322 is approximately 6.5:1. However, the ratio may range between approximately 6.5:1 and approximately 8.5:1. The arms 1316 and 1322 are approximately between 12% and 15% the size of the length of arms 1318 and 1320.

The stabilizer 1306 may be formed from a length or member (e.g., a rebar or pipe folded inward onto itself). In some cases, the length of rebar may be folded at a first end 1324 and a second end 1326 to form a main arm 1328 and two folded arms 1330 and 1332. The illustrated main arm 1328 may be between nine and three fourths inches long and three feet nine and three fourths inches long and the folded arms 1330 and 1332 may be between three and one fourth inches long each and nine and one fourth inches long each. In this example, the main arm 1328 has a length of approximately one foot nine and three fourths inches and the folded arms have a length of approximately seven and one fourth inches long. The arcs 1324 and 1326 may each have a radius of approximately one inch, but in other embodiments they may have a radius between half an inch and two inches.

The ratio of the length of the main arm 1328 to one of the folded arms 1330 or 1332 may range from approximately 3:1 to approximately 5:1. In this example, the ratio is approximately 3:1. The folded arms 1330 and 1332 are approximately 20% to 33% the length of the main arm 1328.

In this example, the length of the rebar used to form the stabilizer 1306 may be approximately 60% of the length of rebar used to form the saddle member 1304. Generally, the total length of rebar used to form the saddle member 1304 may be longer than the rebar used to form the stabilizer 1306. The rebar of the stabilizer 1306 may be between three eighths to one inch in diameter, but in this instance the stabilizer 1306 is half an inch thick.

The first end 1324 may engage the arm 1316 of the saddle member 1304 at the arc 1310. The second end 1326 may engage the arm 1322 of the saddle member 1304 at the arc 1314. In one example, the saddle member 1304 and stabilizer 1306 may be permanently coupled to one another. In another example, the saddle member 1304 and stabilizer 1306 may be releasably coupled to one another. In some embodiments, the stabilizer 1306 may form a closed ring or oval shape, such that folded arms 1330 and 1332 are in contact or connected, either releasably or permanently. In other cases, such as the illustrated example, the folded arms 1330 and 1332 may be separated by a gap 1334 between three and one fourth inches and two feet three and one fourth inches wide. In this particular example, the gap 1334 that is three and one fourth inches wide.

Each stake 1308 may be bent at point 1336 to form two parallel arms 1338 and 1340 of equal length and diameter.

The stake 1308 may be bent in such a way that a space 1342 may remain between arms 1338 and 1340. The space 1342 may be between approximately 1 and 4 inches wide, but in this example the space 1342 is approximately 2 inches. Each space 1342 in stakes 1308 allows each stake 1308 to be aligned in a perpendicular orientation with the saddle member 1304, such that when each stake 1308 is inserted into the ground the stakes 1308 interlock with the arcs 1310, 1312, and 1314 of the saddle member 1304.

In some embodiments, such as the one shown in the illustrated example, the length of rebar used to create the stake may be folded at point 1336 to form two arms 1338 and 1340 between one foot four and one half inches and three feet four and one half inches in length. This specific example shows two arms 1338 and 1340 each of length two feet four and one half inches. The arc 1336 may have a radius of approximately one inch, but in other embodiments the radius may be between approximately half an inch and two inches. For example, the illustrated stake 1308 may be useful for securing a tree being rooted in rocky soils.

The arcs 1310, 1312, 1314, 1324, 1326, and 1336 of the saddle member 1304, the stabilizer 1306, and the stakes 1308 are demonstrated as being generally circular in this example in order to make the stakes stronger. However, the arcs may also be triangular, square, elliptical, oblong, or a variety of other shapes.

Figure 14:
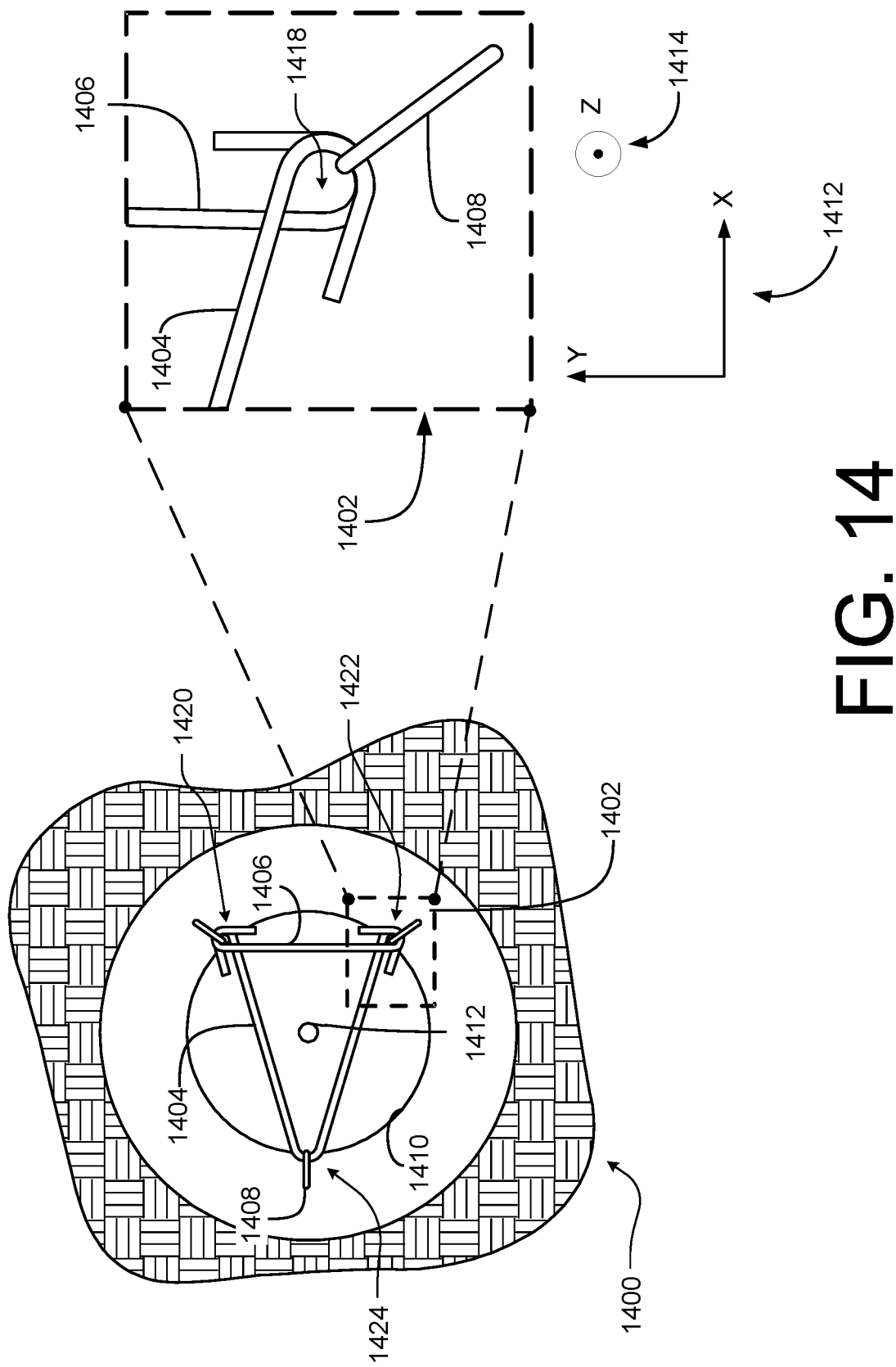
FIG. 14 illustrates an example of an overhead view of an underground tree stake system and an enlargement of its connection mechanism according to some implementations.

FIG. 14 illustrates an overhead view of an underground tree stake system 1400 and an enlarged view 1402 of the connection between a saddle member 1404, a stabilizer 1406, and a stake 1408 according to some implementations. The underground tree stake system 1400 secures a tree or plant's root ball 1410. The saddle member 1404 and the stabilizer 1406 may be placed around the tree trunk or plant stem 1412 and on top of the root ball 1410. In some cases, the saddle member 1404 and the stabilizer 1406 are aligned such that arcs of the saddle member 1404 align with the arcs of the stabilizer 1406 to form a closed opening 1418. Thus, when properly positioned, saddle member 1404 and stabilizer 1406 should be in releasable contact to form the closed opening 1418 in the x-y plane 1412. By forming a closed opening 1418 when the stake 1408 is driven into the ground around the root ball 1410, the stake 1408, the saddle member 1404, and the stabilizer 1406 act to resist forces in the x and y directions 1412 as well as in the z direction 1414. Thus, the stake 1408 should form a half loop over the saddle member 1404 and the stabilizer 1406 in the z-direction 1414.

In some cases, the saddle member 1404 and/or the stabilizer 1406 may include notches, mating portions, guides, or other type of alignment marking to assist with ensuring that the saddle member 1404 and the stabilizer 1406 are positioned correctly prior to securing with the stake 1408. In some cases, additional guides, notches, mating portions, or other types of alignment markings may be placed on the saddle member 1404 and/or the stabilizer 1406 to assist with correct alignment of the stake 1408 with the closed opening 1418. For example, the saddle member 1404 may include a groove for receiving the stake 1408 on a top surface and male or female connectors on a bottom surface. In some cases, the stabilizer 1406 may include the opposing male or female connectors to mate with and align the stabilizer 1406 with the saddle member 1404. It should be understood that in some examples, the stabilizer 1406 may be configured to be placed over the saddle member 1404, such that a top surface of the stabilizer 1406 may include the groove for aligning the stake 1408 in lieu of the groove on the saddle member 1404.

Once, the saddle member 1404 and the stabilizer 1406 are aligned, the stake 1408 may be aligned with the arcs or corners 1420, 1422, and 1424 and driven into the ground or surface 1406 in order to engage the saddle member 1404 and the stabilizer 1406 and apply a downward force on the root ball 1410 via force transfer from the saddle member 1404 and the stabilizer 1406. In some cases, the stakes 1408 should engage with the ground 1406 around the root ball 1410 to avoid any harm to the tree 1412. For example, the saddle member 1404 and the stabilizer 1406 may be sized such that at least a portion of the length of the saddle member 1404 and the stabilizer 1406 overlap the root ball 1410 but the corners 1420, 1422, and 1424 of the saddle member 1404 and the stabilizer 1406 are located outside or past the edge of the root ball 1410.

Figure 15:
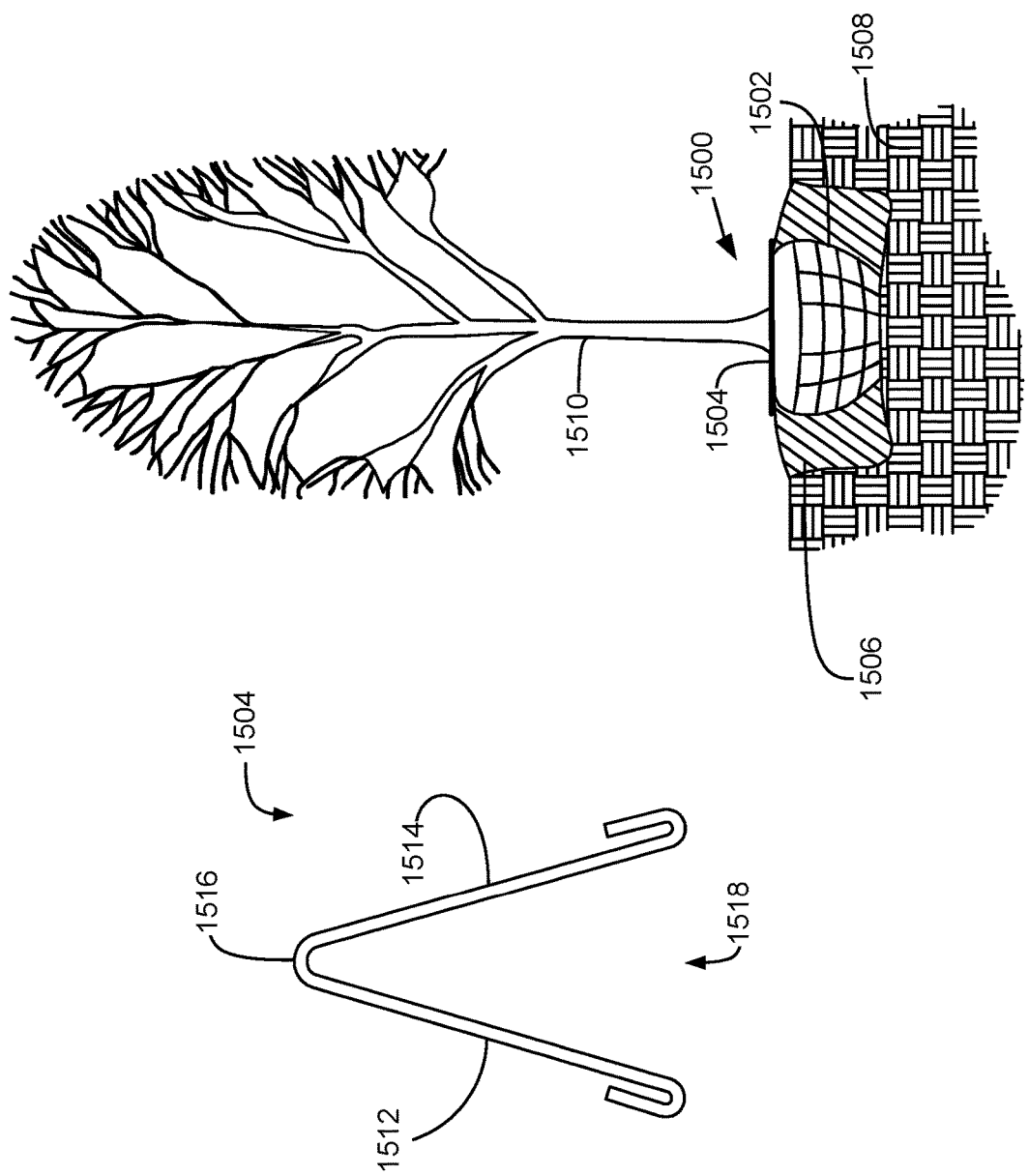
FIG. 15 illustrates an example of an underground tree stake system being installed on a tree root ball according to some implementations.

FIG. 15 illustrates an example of an underground tree stake system 1500 being installed on a root ball 1502 according to some implementations. As shown in the illustrated example, the saddle member 1504 may be placed on top of and in contact with a root ball 1502 that has been placed inside a hole 1506 in the ground 1508.

The saddle member 1504 may be set in place by first aligning it with the tree trunk 1510 so that the tree trunk is engaged between the two arms 1512 and 1514. Then, the saddle member 1504 may be lowered until it comes in contact with the root ball 1502 or ground 1508. Alternatively, the saddle member 1504 may be placed on the ground 1508 to begin with and then slid onto the root ball 1502 until the tree trunk 1510 is approximately equidistant from arms 1512 and 1514, as well as approximately equidistant from arc 1516 and space 1518.

FIG. 16 illustrates another example of an underground tree stake system 1500 from FIG. 15 being installed on a root ball 1502 according to some implementations. In this case, the saddle member 1504 may be placed on top of and in contact with a root ball 1502 that has been placed inside a hole 1506 in the ground 1508. A stabilizer 1602 may be positioned over the saddle member 1504 and guided along an axis 1604 until the stabilizer 1602 comes in contact with and rests upon saddle member 1504.

Alternatively, the stabilizer 1602 may be slid onto saddle member 1504 instead of lowered along an axis 1604. In either case, the saddle member 1504 and stabilizer 1602 should ultimately end up coupled to each other. In an alternative example, the stabilizer 1602 may be positioned prior to the saddle member 1504, such that the stabilizer 1602 is placed on top of the saddle member 1504.

Figure 17:
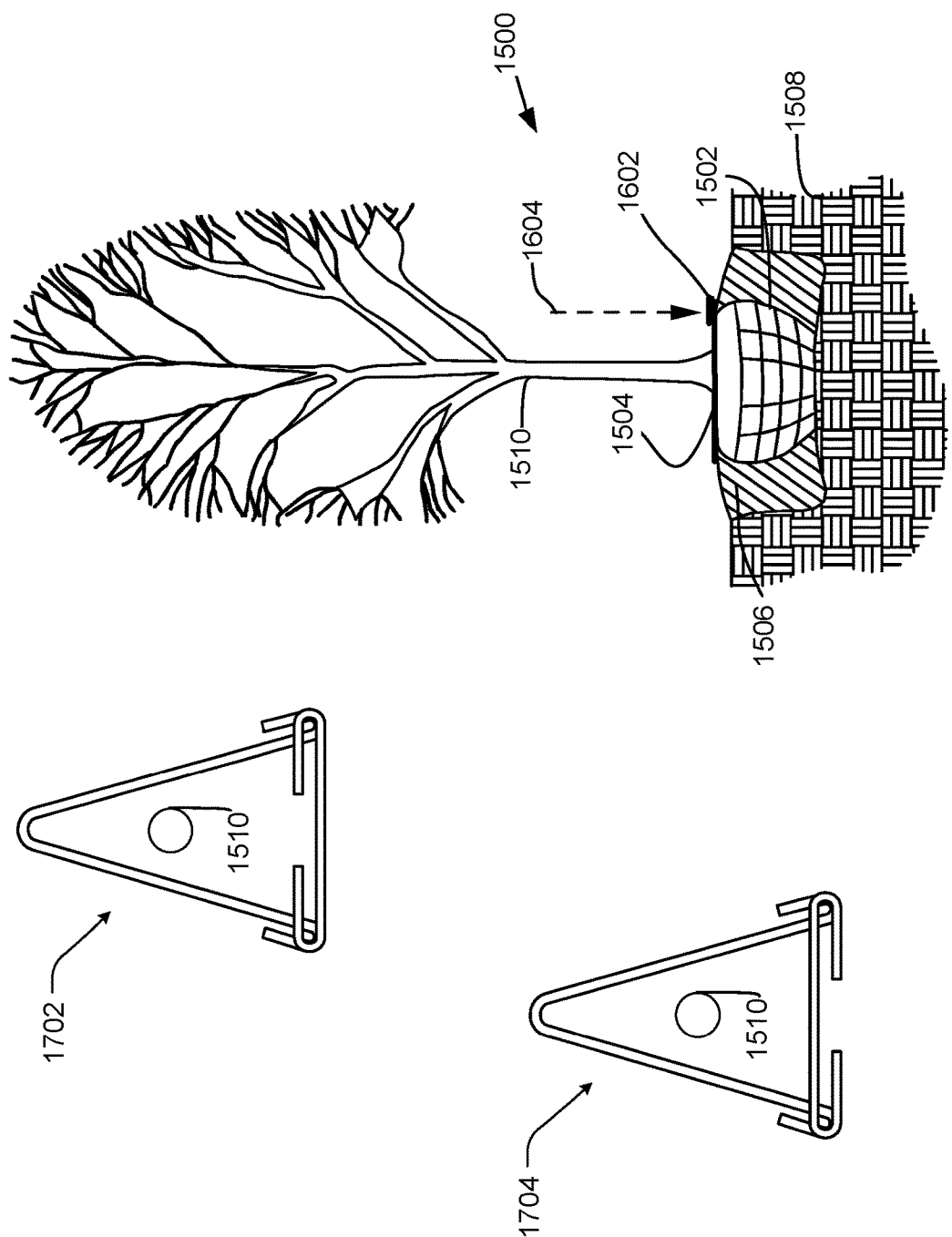
FIG. 17 illustrates an example of an underground tree stake system being installed on a tree root ball according to some implementations.

FIG. 17 illustrates another example of an underground tree stake system 1500 being installed on a root ball 1502 according to some implementations. In this case, the stabilizer 1602 has been brought in contact with saddle member 1504 to form a closed opening as discussed above. In one case, the arms 1512 and 1514 may be permanently coupled to the saddle member 1504, by welding for example. It should be understood, that the stabilizer gap 1610 may be oriented such that the opening is facing the tree 1510, as illustrated by 1702, or in the opposite direction as illustrated by 1704.

FIG. 18 illustrates another example of an underground tree stake system 1500 from FIG. 15 being installed on a root ball 1502 according to some implementations. In this case, stakes 1802 may be inserted into the ground 1508 by being placed over the saddle member 1504 and guided downward along the axis 1604 from FIG. 16. Once in place, the stakes 1802 may provide a downward force or a resistance to upward force.

When properly in place, anywhere from 75-95% of the stakes 1802 should be beneath the surface of the ground 1509 from FIG. 15. In this example, approximately 95% of the stakes 1802 are beneath ground 1509. The aerial view 1804 demonstrates how the system should appear before a second layer of gravel or dirt is added on top.

Figure 19:
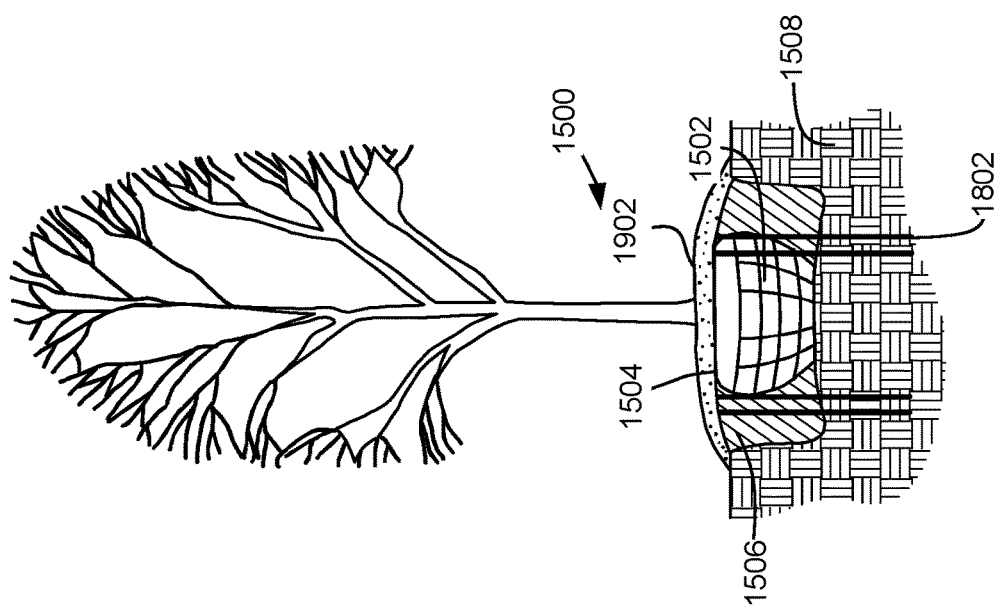
FIG. 19 illustrates an example of an underground tree stake system being installed on a tree root ball according to some implementations.

FIG. 19 illustrates another example of an underground tree stake system 1500 from FIG. 15 being installed on a root ball 1502. In this case, the underground tree stake system 1500 has been installed successfully on the root ball 1502. The saddle member 1504, stabilizer 1602 from FIG. 16, and stakes 1802 may each be releasably engaged. In some cases, the stakes 1802 from FIG. 18 are long enough (e.g., greater than 1 foot, 1.5 feet, or 2 feet) to extend through the hole 1506 into the ground 1508 in order to provide support. The hole 1506 is filled in and covered at ground level 1902 to completely hide the mechanism from sight. In some examples, the system may be installed at ground level 1902 instead of in the hole 1506 from FIG. 15. In these cases, the saddle member 1504 and stabilizer 1602 from FIG. 16 may rest on the surface of the ground 1508.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A saddle member for stabilizing a tree comprising:
    a w-unit formed from a first single length of material along a first axis and a second axis, the first axis and the second axis aligned in a substantial horizontal plane such that an intersection of the first axis and the second axis coincides with an approximate center of a trunk of the tree and the w-unit including:
        a first arc positioned to the left of the first axis and below the second axis, the first arc opening in a first direction, the first direction towards the second axis;
        a second arc positioned to the right of the first axis and below the second axis, the second arc opening in the first direction;
        a third arc positioned along the first axis and above the second axis, the third arc opening in a second direction opposite the first direction and configured to couple to a first stake to secure the saddle member and the tree to a ground;
        a first arm portion extending upward from the first arc at a first angle away from the first axis;
        a second arm portion extending upward from the first arc at a second angle towards the first axis and downward from the third arc at a third angle away from the first axis;
        a third arm portion extending upward from the second arc at a fourth angle towards the first axis;
        a fourth arm portion extending upward from the second arc at a fourth angle away from the first axis; and
    a stabilizer formed from a second single length of material, the stabilizer being folded at a first end and at a second end to provide a top portion, a first folded portion, and a second folded portion, wherein a first opening is provided between the top portion and the first folded portion and a second opening is provided between the top portion and the second folded portion, the first opening is configured to receive the first arm of the w-unit and the second opening is configured to receive the fourth arm of the w-unit; and
    wherein the coupling of the stabilizer to the w-unit provides a first connection area to the left of the first axis and a second connection area to the right of the first axis, the first connection area defined by the first arc of the w-unit and the first folded portion of the stabilizer, the first connection area configured to couple to a second stake and the second connection area configured to couple to a third stake, wherein the second stake and the third stake secure the saddle member and the tree to the ground.

2. The saddle member as recited in claim 1, wherein the first arc has a radius of one and half inches, the second arc has a radius of one and half inches, and the third arc has a radius of one and three fourths inches.

3. The saddle member as recited in claim 1, wherein the first arc forms an arc of four and three fourth inches in length, the second arc forms an arc of four and three fourth inches in length, and the third arc forms an arc of five inches in length.

4. The saddle member as recited in claim 1, wherein the material includes rebar having a diameter between approximately three eights of an inch and approximately half an inch.

5. The saddle member as recited in claim 1, wherein the first arm portion includes a first portion at the first angle and a second portion having a five degree greater angle in the first direction than the first portion.

6. The saddle member as recited in claim 1, wherein the first arc, the second arc, and the third arc are each configured to engage a hook of a stake during use.

7. The saddle member as recited in claim 1, wherein the stabilizer releasably couples to the w-unit during use.

8. The saddle member as recited in claim 1, wherein the stabilizer is permanently coupled to the w-unit.

9. A tree staking system comprising:
    a w-unit formed from a first length of rebar in a substantially w shape, the w-unit including a first arc, a second arc, a third arc, a first end, and a second end, the second end opposite the first end;
    a stabilizer formed from a second length of rebar, the stabilizer bent at a first end to provide a first folded member and at a second end to provide a second folded member, the stabilizer including a straight member coupled at the first end to the first folded member and at the second end to the second folded member, the first folded member and the straight member defining a first space for engaging the first end of the w-unit and the second folded member and the straight member defining a second space for engaging the second end of the w-unit, such that the first end of the w-unit is between the first folded member and the straight member and the second end of the w-unit are is between the second folded member and the straight member; and
    a first stake formed from a third length of rebar, the first stake bent at a location to provide a first hook defining a third space for engaging the first arc of the w-unit during use.

10. The tree staking system as recited in claim 9, further comprising
    a second stake from a fourth length of rebar, the second stake bent at a location to provide a second hook defining a fourth space for engaging the second arc of the w-unit during use; and
    a third stake from a fifth length of rebar, the third stake bent at a location to provide a third hook defining a fifth space for engaging the third arc of the w-unit during use.

11. The tree staking system as recited in claim 9, wherein the first arc forms an arc of four and three fourth inches in length, the second arc forms an arc of four and three fourth inches in length, and the third arc forms an arc of five inches in length.

12. The tree staking system as recited in claim 9, wherein the stabilizer releasably couples to the w-unit during use.

13. The tree staking system as recited in claim 9, wherein the stabilizer is permanently coupled to the w-unit.

14. The tree staking system as recited in claim 9, wherein the w-unit includes:
  a first arm portion extending upward from the first arc;
  a second arm portion extending upward from the first arc;
  a third arm portion extending upward from the second arc; and
  a fourth arm portion extending upward from the second arc; and
  wherein the second arm portion is connected to the third arc and the third arm portion is connected to the third arc.

15. A tree staking system comprising:
  a w-unit having a first axis and a second axis aligned in a substantial horizontal plane such that an intersection of the first axis and the second axis coincides with an approximate center of a trunk of a tree, the w-unit including:
    a first arc offset from the first axis in a first direction and offset from the second axis in a second direction;
    a second arc offset from the first axis in a third direction and offset from the second axis in the second direction, the third direction opposite the first direction;
    a third arc aligned along the vertical axis and offset from the second axis in a fourth direction, the fourth direction opposite the second direction;
    a first arm having a first end coupled to the first arc;
    a second arm having a first end and a second end, the second arm coupled to the first arc at the first end and the third arc at the second end;
    a third arm having a first end and a second end, the third arm coupled to the second arc at the first end and the third arc at the second end; and
    a fourth arm having a first end coupled to the second arc;
  a stabilizer including:
    a first portion, the first portion having a first end and a second end;
    a second portion, the second portion coupled to the first end of the first portion such that the second portion and the first portion define a first opening for receiving the second arm during use; and
    a third portion, the third portion coupled to the second end of the first portion such that the third portion and the first portion define a second opening for receiving the fourth arm during use; and
  a first stake having a hook for engaging the first arc of the w-unit during use;
  a second stake having a hook for engaging the second arc of the w-unit during use; and
  a third stake having a hook for engaging the third arc of the w-unit during use.

16. The tree staking system as recited in claim 15, wherein the w-unit, the stabilizer, the first stake, the second stake, and the third stake are formed from at least one of:
  aluminum;
  steel;
  titanium;
  rebar;
  an alloy;
  a polymer; or
  a plastic.

17. The tree staking system as recited in claim 15, wherein the first arc has a radius of one and half inches, the second arc has a radius of one and half inches, and the third arc has a radius of one and three fourths inches.

18. The tree staking system as recited in claim 15, wherein the first arc forms an arc of four and three fourth inches in length, the second arc forms an arcs of four and three fourth inches in length, and the third arc forms an arc of five inches in length.

19. The tree staking system as recited in claim 15, wherein:
  the first arm includes a first arm portion and a second arm portion, the second arm portion of the first arm having a five degree greater angle in the first direction than the first arm portion of the first arm; and
  the fourth arm includes a first arm portion and a second arm portion, the second arm portion of the fourth arm having a five degree greater angle in the third direction than the first arm portion of the fourth arm.

20. The tree staking system as recited in claim 15, wherein the w-unit and the stabilizer are contacted with a root ball of a plant during use.

* * * * *